United States Patent
Ikeda et al.

(10) Patent No.: US 6,739,767 B2
(45) Date of Patent: May 25, 2004

(54) IMAGE PROCESSING METHOD, IMAGE PROCESSING APPARATUS AND IMAGE RECORDING APPARATUS

(75) Inventors: Chizuko Ikeda, Tokyo (JP); Tsukasa Ito, Musashino (JP); Hiroaki Takano, Hachioji (JP)

(73) Assignee: Konica Corporation (JP)

( * ) Notice: Subject to any disclaimer, the term of this patent is extended or adjusted under 35 U.S.C. 154(b) by 2 days.

(21) Appl. No.: 10/366,874

(22) Filed: Feb. 14, 2003

(65) Prior Publication Data

US 2003/0156837 A1 Aug. 21, 2003

(30) Foreign Application Priority Data

Feb. 21, 2002 (JP) ........................................ 2002-044826

(51) Int. Cl.⁷ ............................. G03B 3/00; G03D 13/00
(52) U.S. Cl. ....................... 396/567; 396/569; 396/125; 355/32; 355/38; 355/77; 382/274; 358/516; 358/530; 348/223.1; 348/225.1
(58) Field of Search ........................ 396/125, 567–570; 355/32, 38, 77; 348/223.1, 225.1; 382/274; 358/516, 530

(56) References Cited

FOREIGN PATENT DOCUMENTS

| JP | 07-322274 | | 12/1995 |
|----|-----------|---|---------|
| JP | 2000-261825 | * | 9/2000 |
| JP | 2001-177732 | * | 6/2001 |
| JP | 2001-238177 | * | 8/2001 |
| JP | 2001-261825 | | 9/2001 |

* cited by examiner

Primary Examiner—D. Rutledge
(74) Attorney, Agent, or Firm—Cantor Colburn LLP

(57) ABSTRACT

An image processing method to conduct an image processing on image signals indicating a photographed image for generating image signals for output, having the steps of: detecting an area in the photographed image where the mixed ratio of flashlight to environment light in the course of photographing is greater than a prescribed value, based on respective information including information about environment light in the course of photographing, information about flashlight in the course of photographing, and at least one of information about zoom magnification in the course of photographing, information about ISO speed and information about a subject distance in the course of photographing; and determining a content of image processing in accordance with a ratio of the area detected to the total area of the photographed image.

56 Claims, 7 Drawing Sheets

IMAGE PROCESSING METHOD, IMAGE PROCESSING APPARATUS AND IMAGE RECORDING APPARATUS

BACKGROUND OF THE INVENTION

The present invention relates to an image processing method, an image processing apparatus and an image recording apparatus, all for conducting prescribed image processing on image signals indicating photographed images generated by flash photographing, and thereby for finishing superb images.

In recent years, when image signals indicating photographed images are observed by the use of images outputted on a medium or on CRT, prescribed image processing is generally conducted on the image signals indicating inputted photographed images for giving favorable impression to an observer.

For example, as a known technology, there is a white balance adjustment function. In general, when a scene including a white object is photographed under a fluorescent lamp, for example, the sense of sight of a person recognizes basically the white object to be white on account of color adaptation, and stores it, although the white object is greenish in the photographing location. However, when some color correction or other is not conducted on image data obtained through photographing, the white object turns out to be greenish to be different from memory of a person, which is not preferable. Under a white balance adjustment function equipped on a digital camera and others, therefore, a fluorescent lamp is recognized as environment light, and color correction processing to eliminate greenish tint is conducted.

In addition to the foregoing, there is caused a gap between an impression given to a photographer in the case of photographing and an impression given by an output image, by influences of environment light and color temperature in the case of photographing and of flashlight in the case of flash photographing.

For example, TOKKAIHEI No. 7-322274 discloses a technology that can reproduce images having an excellent white balance, by conducting gamma correction for R, G and B signals based on color temperature information recorded in each frame on a magnetic recording layer of a developed still photo-film, and thereby by correcting color temperature in photographing, with respect to image signals obtained through scanning of frame images on the developed still photo-film. There is further disclosed simultaneously an image processing method, which prevents that a subject turns black by controlling correction and conducting image processing for halftone when conducting gamma correction for RGB signals based on backlight information recorded in each frame on a magnetic recording layer.

Further, in TOKKAI No. 2000-261825, there are disclosed an image processing method and a processing apparatus wherein color conversion is conducted based on specified information wherein specification of color temperature desired by a customer to be outputted is expressed with sensitive expression such as "sober" when color temperature owned by images is changed and outputted, and output images with impression according to an image of a person who observes is obtained.

Further, in TOKKAI No. 2001-238177, there are disclosed an image processing method and an image processing apparatus wherein image data of photographing scene of a subject is obtained in a camera, then, camera information obtained or inputted in photographing of a subject is obtained, and further when occasion demands, related information concerning this photographing scene is taken in, and photographing scene is estimated by at least one of camera information and related information or by a combination of this and image data, and prescribed image processing according to the estimated photographing scene is conducted.

Further, in TOKKAI No. 2001-177732, there is disclosed an image processing apparatus wherein environment light information, flash information and an object distance in flash photographing are obtained, and in accordance with information of the aforesaid information, color reproduction condition that differs for each image area is established, and image processing is conducted so that a principal subject and a background may show suitable color preference.

(Subjects to be Solved by the Invention)

However, when recent diversification of generating means for image signals indicating photographed images, including an inexpensive digital camera for toy use, a lens shutter digital camera, an SLR high-grade digital camera, a film scanner and a flat-bed scanner, diversification of photographing surroundings and photographing scenes which advance following the aforementioned diversification of generating means for image signals, and demands of customers for further high quality are considered, for example, it cannot be said that all of them have sufficient effects.

For example, the technology disclosed in the aforesaid TOKKAIHEI No. 7-322274 is one to conduct image processing on a magnetic recording layer of a developed still photo-film based on color temperature information recorded in each frame, but for an image on a developed still photo-film having no magnetic recording layer and an image obtained through scanning in a digital camera, it is impossible to record color temperature information on each frame, which makes the aforesaid technology to be poor in versatility. In addition, there is caused a difference between equipment models in terms of writing of information, depending on camera types and performances, which also makes the aforesaid technology to be poor in versatility. Further, the technology cannot be applied to the scene that is controlled in flash photographing by plural light sources such as environment light and flashlight, because a color temperature varies depending on an area in the image.

Further, the technology disclosed in TOKKAI No. 2000-261825 is one in which color conversion is conducted based on specified information wherein color temperature which is desired by a customer to be outputted is expressed with specified sensitive expression such as "sober", in which one sensitive expression corresponds to one color temperature value. However, an image imagined by a customer from the sensitive expression is various and is not univocal, which makes it difficult to say positively that customers are fully satisfied.

The technology disclosed in the aforesaid TOKKAI No. 2001-238177 is one wherein image data of photographing scene of a subject photographed in a camera are obtained, then, camera information obtained or inputted in the course of photographing a subject and related information concerning the photographing scene are obtained, and photographing scene is estimated by the use of the obtained information so that prescribed image processing is conducted in accordance with the estimated photographing scene. In this technology, however, there is no consideration about a scene controlled by plural light sources such as environment light and flashlight which are used frequently by general users for photographing represented by indoor flash photographing under a fluorescent lamp or a tungsten lamp, thus, it is impossible to cope with images wherein a light source varies depending on an area in the image.

The technology disclosed in the aforesaid TOKKAI No. 2001-177732 is one wherein environment light information, flash information and an object distance are obtained, then, a color reproduction condition that varies depending on each area in the image is established in accordance with the aforesaid information, and image processing is conducted so that a principal subject and a background may show suitable color preference. However, the technology does not pay any attention to the fact that an effective area and an effective light amount of flashlight for the area for a subject to be photographed are dependent greatly not only on the object distance but also on a zoom magnification and ISO speed. When the image acquired has already been subjected to color correction processing by a white balance function in a digital camera, for example, there is no consideration about conditions for conducting processing, namely, about intention to correct an influence of light, which makes the technology stated above to be short of versatility.

The invention provides an image processing method and an image processing apparatus which conduct prescribed image processing on images obtained through photographing under plural light sources each being different in tint such as environment light and flashlight such as a fluorescent lamp and tungsten light represented by indoor flash photographing, and generate image signals that can give to an observer superb impressions not only of a principal subject but also of a background, and an image recording apparatus for giving preferable output images.

SUMMARY OF THE INVENTION

The invention includes the following structures to attain the subjects stated above.

Structure (1)

An image processing method conducting image processing on image signals indicating photographed images and generating image signals for output use, wherein an area where the mixed ratio of flashlight to environment light in the course of photographing is greater than a prescribed value is detected, and based on respective information including information about environment light in the course of photographing, information about flashlight in the course of photographing, and at least one of information including information about zoom magnification in the course of photographing, information about ISO speed and information about a subject distance in the course of photographing, and contents of image processing are determined in accordance with a ratio of the detected area to the total area.

Structure (2)

The image processing method according to Structure (1), wherein said respective information further includes information about a subject distance in the course of photographing, and an area where the mixed ratio of flashlight to environment light in the course of photographing is greater than a prescribed value is detected based on said respective information.

Structure (3)

An image processing method conducting image processing on image signals indicating photographed images and generating image signals for output use, wherein it is estimated if an area irradiated by both of environment light and flashlight is present in the photographed images, based on information about environment light in the course of photographing and information about flashlight in the course of photographing, an area where the mixed ratio of flashlight to environment light in the course of photographing is greater than a prescribed value is detected and a determining process that determines contents of the image processing based on information about environment light in the course of photographing, information about flashlight in the course of photographing and on at least one of information about zoom magnification in the course of photographing, information about ISO speed and information about a subject distance in the coursed of photographing, and contents of image processing are determined in accordance with a ratio of the detected area to the total area of the exposed area.

Structure (4)

The image processing method according to Structure (3) wherein estimation of whether an area irradiated by both of environment light and flashlight is present in the image or not is made based on information about environment light in the course of photographing, information about flashlight in the course of photographing and on information about a subject distance in the course of photographing.

Structure (5)

An image processing method conducting image processing on image signals indicating photographed images and generating image signals for output use, wherein whether an area irradiated by both of environment light and flashlight is present in the image or not is estimated based on information about environment light in the course of photographing and information about flashlight in the course of photographing, the mixed ratio of flashlight to environment light both in the course of photographing is estimated based on environment light in the course of photographing, flashlight in the course of photographing and, at least one of information about zoom magnification in the course of photographing, information about ISO speed and information about a subject distance, an area where the mixed ratio of flashlight to environment light in the course of photographing is greater than a prescribed value, is detected, and contents of the image processing are determined based on the mixed ratio of the detected area to the total area of photographed images.

Structure (6)

The image processing method according to Structure (5) wherein whether an area irradiated by both of environment light and flashlight is present in the photographed images or not is estimated based on information about environment light in the course of photographing, information about flashlight in the course of photographing and information about subject distance in the course of photographing.

Structure (7)

An image processing method to conduct an image processing on image signals indicating a photographed image for generating image signals for output, having the steps of: obtaining information about a white balance adjustment function of a photographing apparatus used to get the photographed images; and determining a content of image processing based on the obtained information about a white balance adjustment function.

Structure (8)

The image processing method according to either one of Structures (1)–(6), wherein information about a white balance adjustment function of a photographing apparatus that acquires photographed images is obtained, and contents of image processing are determined based on the obtained information.

Structure (9)

The image processing method according to either one of Structures (7) and (8), wherein whether the white balance adjustment function operates automatically in the course of photographing or not is estimated, and contents of image processing are determined based on the results of the estimation.

Structure (10)

The image processing method according to Structure (9), wherein when the white balance adjustment function is estimated to have operated automatically in the course of photographing, contents of image processing are determined based on information used in determining adjustment conditions for the white balance adjustment function.

Structure (11)

The image processing method according to Structure (10), wherein information used in determining the adjustment condition for the white balance adjustment function includes information about light for photographing.

Structure (12)

The image processing method according to either one of Structure (1) and Structures (3)–(6), wherein information about the flashlight includes information of return of the flashlight.

Structure (13)

The image processing method according to either one of Structures (1)–(3) and Structure (5), wherein when detecting an area where the mixed ratio of flashlight to environment light both in the course of photographing is greater than a prescribed value, the detection is made based on at least one of information about a subject area and information about a subject position.

Structure (14)

The image processing method according to either one of Structures (1)–(13), wherein the contents of image processing include at least one of contrast correction processing, color balance correction processing, hue correction processing, chroma correction processing, lightness correction processing, and sharpness enhancement processing.

Structure (15)

The image processing method according to Structure (14), wherein color balance correction is conducted, whose correction condition has been determined based on at least one of information about environment light in the course of photographing and information about flashlight in the course of photographing.

Structure (16)

The image processing method according to Structure (15), wherein information about the environment light and information about the flashlight include information about light characteristics.

Structure (17)

An image processing apparatus conducting image processing on image signals indicating photographed images inputted by an image inputting means (section), and generating image signals for output use, wherein there are provided an area detecting means (section) that detects an area where the mixed ratio of flashlight to environment light in the course of photographing is greater than a prescribed value, based on information about environment light in the course of photographing, information about flashlight in the course of photographing and, at least one of information about zoom magnification in the course of photographing, information about ISO speed and information about a subject distance in the course of photographing, and an image processing means (section) that determines contents of image processing for the image signals and conducts image processing, in accordance with the mixed ratio of the detected area to the total area.

Structure (18)

The image processing apparatus according to Structure (17), wherein each information mentioned above includes information about a subject distance in the course of photographing, and the area detecting means (section) detects an area where the mixed ratio of flashlight to environment light in the course of photographing is greater than a prescribed value.

Structure (19)

An image processing apparatus conducting image processing on image signals indicating photographed images inputted by an image inputting means (section), and generating image signals for output use, wherein there are provided a mixed area estimating means (section) that estimates if an area irradiated by both of environment light and flashlight is present in the photographed images, based on information about environment light in the course of photographing and information about flashlight in the course of photographing, an area detecting means (section) that detects an area where the mixed ratio of flashlight to environment light in the course of photographing is greater than a prescribed value, based on information about environment light in the course of photographing, information about flashlight in the course of photographing and at least one of information about zoom magnification in the course of photographing, information about ISO speed and information about a subject distance in the course of photographing, and an image processing means (section) that determines contents of image processing in accordance with the ratio of the detected area to the total area, and conducts image processing for the image signals.

Structure (20)

The image processing apparatus according to Structure (19), wherein the mixed area estimating means (section) estimates if an area irradiated by both of environment light and flashlight is present in the photographed images, based on information about environment light in the course of photographing, information about flashlight in the course of photographing and information about a subject distance in the course of photographing.

Structure (21)

An image processing apparatus conducting image processing on image signals indicating photographed images inputted by an image inputting means (section), and generating image signals for output use, wherein there are provided an mixed area estimating means (section) for estimating whether or not an area irradiated by both of environment light and flashlight is present in the photographed image, based on information about environment light in the course of photographing and information about flashlight in the course of photographing; a mixed ratio estimating means (section) for estimating a mixed ratio of flashlight to environment light both in the course of photographing based on information about environment light in the course of photographing, information about flashlight in the course of photographing and, at least one of information about zoom magnification in the course of photographing, information about ISO speed and information about a subject distance in the course of photographing; an area detecting means (section) for detecting an area where the mixed ratio of flashlight to environment light in the course of photographing is greater than a prescribed value; and an image processing means (section) that determines contents of image processing in accordance with the ratio of the detected area to the total area, and conducts image processing on the image signals.

Structure (22)

The image processing apparatus according to Structure (21), wherein there is estimated if an area irradiated by both of environment light and flashlight is present in the photographed images, based on information about environment light in the course of photographing, information about flashlight in the course of photographing and information about a subject distance in the course of photographing.

Structure (23)

An image processing apparatus conducting image processing on image signals indicating photographed images inputted by an image inputting means (section), and generating image signals for output use, wherein there are provided an information acquiring means (section) that acquires information about a white balance adjustment function of a photographing apparatus acquiring the photographed images and an image processing means (section) that determines contents of image processing for the image signals based on information obtained by the information acquiring means (section).

Structure (24)

The image processing apparatus according to either one of Structures (17)–(22), wherein an image acquiring means (section) that acquires information about a white balance adjustment function of a photographing apparatus that acquires the photographed images is further provided, and the image processing means (section) determines contents of image processing based further on information acquired by the information acquiring means (section).

Structure (25)

The image processing apparatus according to Structure (23) or Structure (24), wherein the image processing means (section) judges if the white balance adjustment function operates automatically, and determines contents of image processing based on the results of the judgment.

Structure (26)

The image processing apparatus according to Structure (25), wherein the image processing means (section) determines contents of image processing based on information used for determining adjustment conditions for the white balance adjustment function, when it judges that the white balance adjustment function operated automatically in the course of photographing.

Structure (27)

The image processing apparatus according to Structure (26), wherein information used for determining adjustment conditions for the white balance adjustment function includes information about light for photographing.

Structure (28)

The image processing apparatus according to either one of Structure (17) and Structures (19)–(22), wherein information about the flashlight includes information of return of the flashlight.

Structure (29)

The image processing apparatus according to either one of Structures (17)–(19) and Structures (21), wherein the area detecting means (section) detects an area where the mixed ratio of flashlight to environment light in the course of photographing is greater than a prescribed value, based on at least one of information about a subject area and information about a subject position.

Structure (30)

The image processing apparatus according to either one of Structures (17)–(29), wherein the contents of image processing include at least one of contrast correction processing, color balance correction processing, hue correction processing, chroma correction processing, lightness correction processing and sharpness enhancement processing.

Structure (31)

The image processing apparatus according to Structure (30), wherein the contents of image processing include color balance correction processing wherein correction conditions have been determined by the image processing means (section), based on at least one of information about environment light in the course of photographing and information about flashlight in the course of photographing.

Structure (32)

The image processing apparatus according to Structure (31), wherein information about the environment light and information about flashlight include information about light characteristics.

Structure (33)

An image recording apparatus that conducts image processing on image signals indicating photographed images inputted by an image inputting means (section), and generates and records image signals for output use, wherein there are provided an area detecting means (section) that detects an area where the mixed ratio of flashlight to environment light in the course of photographing is greater than a prescribed value, based on respective information including information about environment light in the course of photographing, information about flashlight in the course of photographing and at least one of information about zoom magnification in the course of photographing, information about ISO speed and information about a subject distance in the course of photographing, and an image processing means (section) that determines contents of image processing for the image signals in accordance with the rate of the detected area to the total area, and conducts image processing.

Structure (34)

The image recording apparatus according to Structure (33), wherein the respective information further include information about a subject distance in the course of photographing, and the area detecting means (section) detects an area where the mixed ratio of the environment light to flashlight in the course of photographing is greater than a prescribed value, based on the respective information.

Structure (35)

An image recording apparatus that conducts image processing on image signals indicating photographed images inputted by an image inputting means (section), and generates and records image signals for output use, wherein there are provided a mixed area estimating means (section) that estimates if an area irradiated by both of environment light and flashlight is present in the photographed images, based on information about environment light in the course of photographing and information about flashlight in the course of photographing, an area detecting means (section) that detects an area where the mixed ratio of flashlight to environment light in the course of photographing is greater than a prescribed value, based on information about environment light in the course of photographing, information about flashlight in the course of photographing and on at least one of information about zoom magnification in the course of photographing, information about ISO speed and information about a subject distance in the course of photographing, and an image processing means (section) that determines contents of image processing in accordance with the ratio of the detected area to the total area of photographed images, and conducts image processing on the image signals.

Structure (36)

The image recording apparatus according to Structure (35), wherein the mixed area estimating means (section) estimates if an area irradiated by both of environment light and flashlight is present in the photographed images, based on information about environment light in the course of photographing, information about flashlight in the course of photographing and on information about a subject distance in the course of photographing.

Structure (37)

An image recording apparatus that conducts image processing on image signals indicating photographed images inputted by an image inputting means (section), and generates and records image signals for output use, wherein there are provided a mixed area estimating means (section) that estimates if an area irradiated by both of environment light and flashlight is present in the photographed images, based on information about environment light in the course of photographing and information about flashlight in the course of photographing, a mixed ratio estimating means (section) that estimates the mixed ratio of flashlight to environment light in the course of photographing, based on information about environment light in the course of photographing, information about flashlight in the course of photographing and on at least one of information about zoom magnification in the course of photographing, information about ISO speed and information about a subject distance in the course of photographing, an area detecting means (section) that detects an area where the mixed ratio of flashlight to environment light in the course of photographing is greater than a prescribed value, and an image processing means (section) that determines contents of image processing in accordance with the ratio of the detected area to the total area of photographed images, and conducts image processing on the image signals.

Structure (38)

The image recording apparatus according to Structure (37), wherein the mixed area estimating means (section) estimates if an area irradiated by both of environment light and flashlight is present in the photographed images, based on information about environment light in the course of photographing, information about flashlight in the course of photographing and on information about a subject distance in the course of photographing.

Structure (39)

An image recording apparatus that conducts image processing on image signals indicating photographed images inputted by an image inputting means (section), and generates and records image signals for output use, wherein there are provided an information acquiring means (section) that acquires information about a white balance adjustment function of a photographing apparatus by which the photographed images are acquired, and an image processing means (section) that determines contents of image processing for the image signals based on information acquired by the information acquiring means (section), and conducts image processing.

Structure (40)

The image recording apparatus according to either one of Structures (33)–(38), wherein an information acquiring means (section) that acquires information about a white balance adjustment function of a photographing apparatus that acquires the photographed images is further provided, and the image processing means (section) determines contents of image processing based on information obtained by the information acquiring means (section).

Structure (41)

The image recording apparatus according to Structure (39) or Structure (40), wherein the image processing means (section) judges if the white balance adjustment function operates automatically in the course of photographing, and determines contents of image processing in accordance with the results of the judgment.

Structure (42)

The image recording apparatus according to Structure (41), wherein when the image processing means (section) judges that the white balance adjustment function operates automatically in the course of photographing, it determines contents of image processing based on information used for determining adjustment conditions of the white balance adjustment function.

Structure (43)

The image recording apparatus according to Structure (42), wherein information used for determining adjustment conditions of the white balance adjustment function includes information about light for photographing. information of return of flashlight.

Structure (44)

The image recording apparatus according to Structure (33) and Structures (35)–(38), wherein information about the flashlight includes information of return of flashlight.

Structure (45)

The image recording apparatus according to either one of Structures (33)–(35) and Structure (37), wherein the area detecting means (section) detects an area where the mixed ratio of flashlight to environment light in the course of photographing is greater than a prescribed value, based on at least one of information about a subject area and information about a subject position.

Structure (46)

The image recording apparatus according to either one of Structures (33)–(45), wherein contents of the image processing includes at least one of contrast correction processing, color balance correction processing, hue correction processing, chroma correction processing, lightness correction processing, and sharpness enhancement processing.

Structure (47)

The image recording apparatus according to Structure (46), wherein the contents of image processing includes color balance correction processing wherein correction conditions are determined by the image processing means (section) based on at least one of information about environment light in the course of photographing and information about flashlight in the course of photographing.

Structure (48)

The image recording apparatus according to Structure (47), wherein information about environment light and information about flashlight include information about light characteristics.

Structure (49)

The image recording apparatus according to either one of Structures (33)–(48), wherein there is further provided a recording means (section) that records the image signals for output use on a recording medium, and the recording means (section) prints the image signals on a print medium to output it.

Structure (50)

The image recording apparatus according to either one of Structures (33)–(48), wherein there is further provided a recording means (section) that records the image signals for output use on a recording medium, and the recording means (section) prints the image signals on a silver halide type photographic paper to output it.

Structure (51)

The image recording apparatus according to either one of Structures (33)–(48), wherein there is further provided a recording means (section) that records the image signals for output use on a recording medium, and the recording means (section) prints the image signals on a print medium through an ink jet method to output it.

Structure (52)

The image recording apparatus according to either one of Structures (33)–(48), wherein there is further provided a recording means (section) that records the image signals for output use on a recording medium, and the recording means (section) prints the image signals on a print medium through an electrophotographic method to output it.

Structure (53)

The image recording apparatus according to either one of Structures (33)–(48), wherein there is further provided a recording means (section) that records the image signals for output use on a recording medium, and the recording means (section) prints the image signals on a print medium through a sublimation method.

Structure (54)

The image recording apparatus according to either one of Structures (33)–(48), wherein there is further provided a recording means (section) that records the image signals for output use on a recording medium, and the recording means (section) prints the image signals on a print medium through a thermal recording method.

Structure (55)

The image recording apparatus according to either one of Structures (33)–(48), wherein there is further provided a recording means (section) that records the image signals for output use on a recording medium, and the recording means (section) records the image signals on a recording medium as digital data.

Structure (56)

The image recording apparatus according to Structure (55), wherein the recording medium is at least one of CD-R, CD-RW, MD, memory card, IC card, flexible disk and magneto-optical disk.

DETAILED DESCRIPTION OF THE PREFERRED EMBODIMENT

Figure 1:
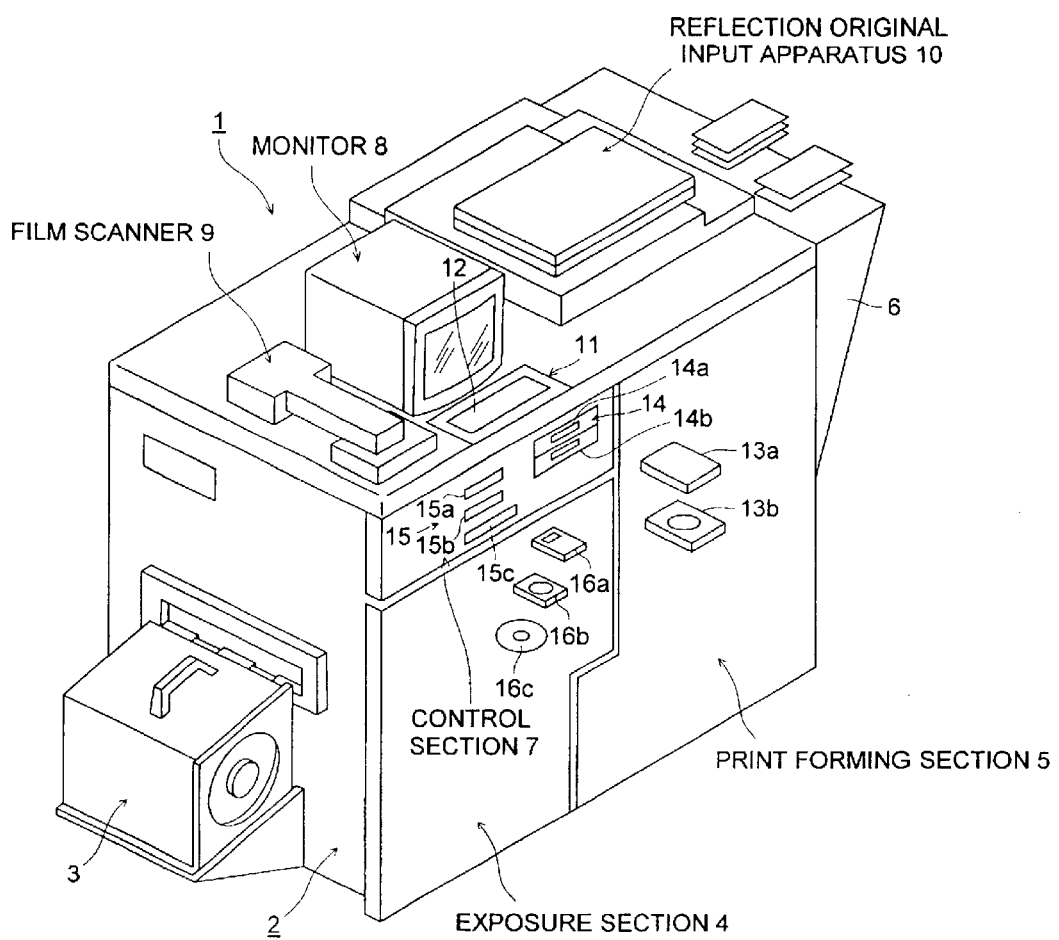
FIG. 1 is an appearance diagram showing the schematic structure of image recording apparatus 1 in the present embodiment to which the invention is applied.

Referring to the drawings, there will be explained, as follows, practical embodiments of an image processing method, an image processing apparatus and an image recording apparatus of the invention, to which, however, the invention is not limited. Now, there will be clarified here the image processing apparatus relating to the invention, or the relationship of correspondence between respective constituent factors of both the image recording apparatus and image recording apparatus 1 in the present embodiment. Namely, the image processing apparatus of the invention, or an image inputting means of the image recording apparatus corresponds to film scanner 9, reflection original input apparatus 10, image reading section 14 and to communication section 17. Further, an area detecting means, a mixed area estimating means and a mixed ratio estimating means, all of the invention correspond to control section 7 of the present embodiment, and an image processing means of the invention corresponds to image processor 70 and control section 7. In addition, an information acquiring means of the invention corresponds to information input device 12, film scanner 9, reflection original input apparatus 10, image reading section 14 and communication section 17. Further, a recording means of the image recording apparatus of the invention corresponds to print forming section 5, image writing section 15 of the image recording apparatus 1 of the present embodiment and an outer printer.

Structures will be explained first.

Figure 2:
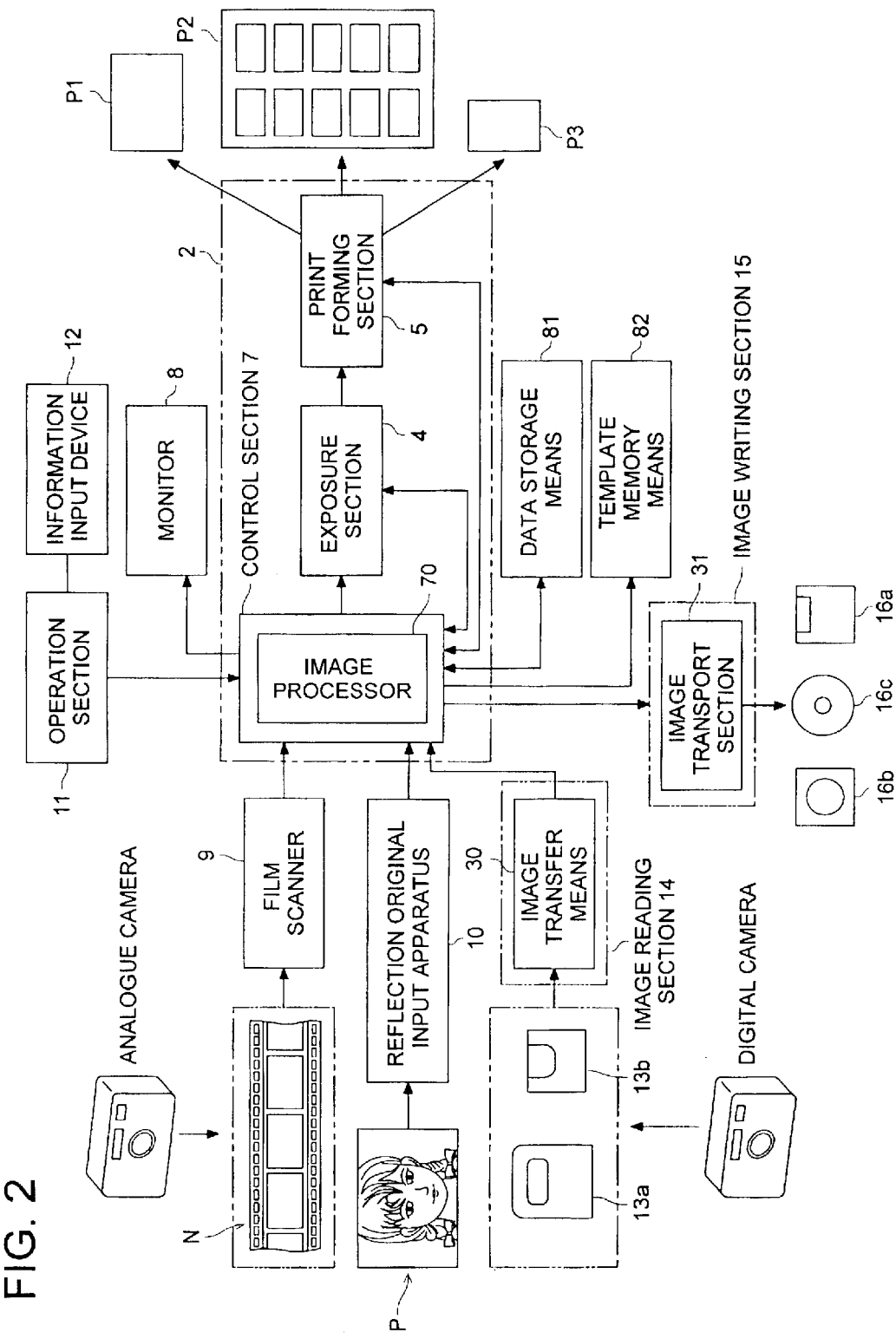
FIG. 2 is a block diagram showing the structure of main portions of the image recording apparatus 1 shown in FIG. 1.
Figure 3:
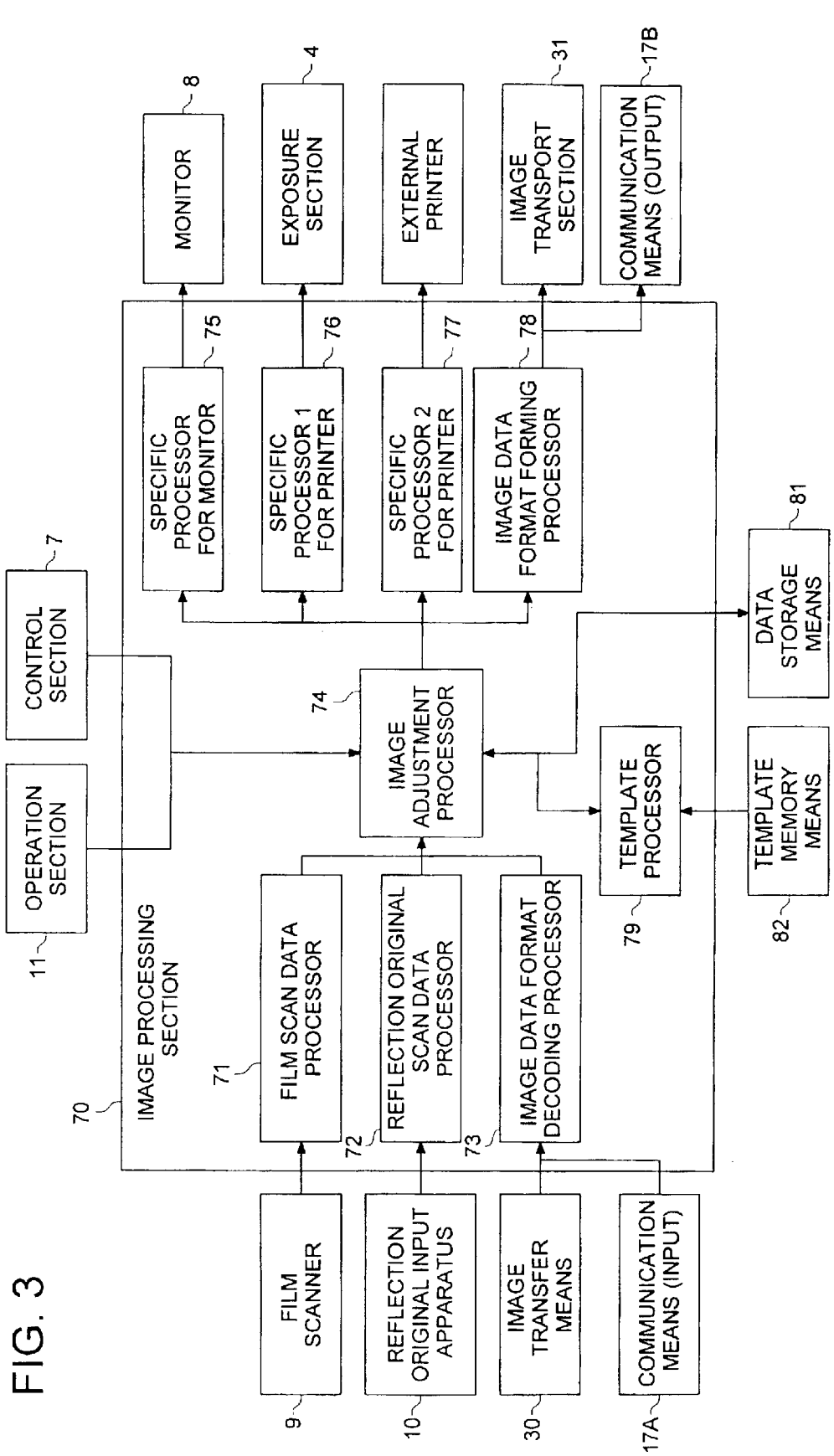
FIG. 3 is a block diagram showing the structure of main portions of image processing section 70 shown in FIG. 1.

Each of FIGS. 1–3 is a diagram showing an embodiment of the image recording apparatus of the invention. The image recording apparatus 1 in this case is represented by one wherein a photosensitive material is exposed to light and is developed to form a print. However, without being limited to this, the invention may also be one that can form a print based on image information which includes, for example, a print forming apparatus of an ink jet type, an electrophotographic type, a heat sensitive type, or a sublimation type. Further, the image recording apparatus 1 may also be an image processing apparatus that is not equipped with an image recording means for recording image information.

Image signals indicating photographed images in the invention mean image data generated by a photographing means such as a digital camera or the like, image data obtained by making photographed images to be electronic with an image input means such as a film scanner and a flat-bed scanner, and data obtained by processing or format-converting the aforesaid data with various application programs. Examples of data format include various types of general purpose image format represented by JPEG (Joint Photographic coding Experts Group), TIFF (Tagged Image File Format), Exif (Exchangeable Image File Format), apparatus models and a specific format for application, and they are given to the embodiment of the invention through storage media or communication lines.

FIG. 1 is an appearance diagram showing the total structure of image recording apparatus 1 in the present embodiment. As shown in FIG. 1, image recording apparatus 1 of the present embodiment is equipped with magazine loading section 3 on the left side of main body 2, and in the main body 2, there are provided exposure processing section 4 that exposes a photosensitive material representing a recording medium (for example, silver halide type photographic paper) and print forming section 5 that develops the exposed photosensitive material and dries it to form a printer. Further, on the right side of the main body 2, there is provided tray 6 to which the formed print is ejected. inside the main body 2. Further, inside the main body 2, control section 7 is provided at the upper position of the exposure processing section 4.

On the upper portion of the main body 2, there is arranged CRT (Cathode Ray Tube) 8. The CRT 8 constitutes a display means that displays, on a screen, images of image information from which a print is to be formed. On the left side of the CRT 8, there is arranged film scanner 9 representing a transmission-type original reading apparatus, and on the right side of the CRT 8, there is arranged reflection original input apparatus 10.

Further, on the front side of the CRT 8, there is arranged operation section 11 on which information input device 12 composed, for example, of a key board and a touch panel is provided.

Further, image reading section 14 is provided on the side of the control section 7 on the main body 2. On the image reading section 14, there are provided PC card use adaptor 14a and floppy (registered trademark) disk (hereinafter referred to as FD) use adaptor 14b, so that PC card 13a and FD 13b can be inserted. The PC card 13a has a memory to store a plurality of image information imaged by a digital camera. A plurality of image information imaged by, for example, a digital camera are stored in floppy (registered trademark) disk 13b.

There is further provided image writing section 15 on the side of the control section 7. On the image writing section 15, there are provided FD use adaptor 15a, MO (Magneto Optical Disk) use adaptor 15b and optical disk use adaptor 15c, so that FD 16a, MO 16b and optical disk 16c can be inserted thereinto, and image information can be written in image recording media. Incidentally, as a recording medium for recording thereon image information relating to the invention other than the recording media stated above, there may be given a multi-media card, a memory card, MD (Mini Disc), CD-R (CD Recordable) and CD-RW (CD Rewritable).

Incidentally, operation section 11, CRT 8, film scanner 9, reflection original input apparatus 10, image reading section 14 and image writing section 15 are provided integrally with the main body 2 to be the structure of the apparatus. However, either one or more of them may be provided separately from the main body 2.

Next, the structures of primary portions of the image recording apparatus 1 will be explained as follows, referring to FIG. 2. FIG. 2 is a block diagram showing the structures of main portions of the image recording apparatus 1.

The control section 7 is composed of unillustrated CPU (Central Processing Unit), RAM (Random Access Memory and ROM (Read Only Memory), and the CPU reads various types of control programs stored in ROM and controls centrally operations of each section constituting the image recording apparatus 1.

To be concrete, the control section 7 reads information of the original coming from film scanner 9 and reflection original input apparatus 10 to acquire image information based on command information from information input means 12, and displays on CRT 8. Further, the control section 7 conducts, at image processor 70, image processing on the image information acquired, and outputs to exposure processing section 4, image writing section 15, communication section 17 or to an outer printer. Details of the image processor 70 will be explained later.

Operation section 11 is structured to be provided with information input means 12 on which a key board is provided. Incidentally, though sample identifying information (D1, D2 and D3) specifying print samples are inputted through operating section 11, the sample identifying information (D1, D2 and D3) are recorded on print samples or on the order sheet. Therefore, a reading means such as OCR (Optical Character Reader) may further be provided in the operation section 11.

Film scanner 9 reads image information out of developed negative film N obtained by developing a negative film used in an analog camera for imaging, then, converts the analog image information into digital image data, and outputs them to control section 7.

A flat-head scanner of reflection original input apparatus 10 reads image information out of print P that is obtained by printing and developing images on a photographic paper, and converts them into digital image data to output to the control section 7.

As an original to be read from film scanner 9 or from reflection original input apparatus 10, in this case, photographic photosensitive materials are used. The photographic photosensitive materials include a color negative film, a color reversal film, a black and white negative film and a black and white reversal film, and image information imaged by an analog camera is recorded on the photographic photosensitive material.

Image reading section 14 reads stored image information imaged by a digital camera from PC card 13a or FD 13b, for transferring. On this image reading section 14, there are provided PC card use adaptor and FD use adaptor as image transfer means 30, and image information recorded on PC card 13a or on FD 13b each inserted in PC card use adaptor 14a or FD use adaptor 14b is read to be transferred to the control section 7. Incidentally, as PC card use adaptor 14a, PC card reader or PC card slot is used.

Image writing section 15 is structured to be provided with FD use adaptor 15a, MO use adaptor 15b and optical disk use adaptor 15c as image transport section 31, and image information are written on image recording media such as FD 16a, MO 16b and optical disk 16c inserted in the image transport section 31.

Data storage means 81 stores image information and order information corresponding to that image information (information about the number of prints to be formed and the image of the frame from which the prints are formed, and information about print sizes), and accumulates them in order.

Template memory means 82 stores beforehand a background images representing sample image data, illustration images and data of at least one template that establishes a compound area, corresponding to sample identifying information D1, D2 and D3.

Exposure section 4 exposes a photosensitive material to images, and sends the photosensitive material to print forming section 5.

The print forming section 5 develops the exposed photosensitive materials and dries them to form prints P1, P2 and P3. In this case, print P1 includes a service size print, an HDTV size print and a panoramic size print, print P2 includes A4 size print and print P3 includes a print in a card size.

Further, image recording apparatus 1 is equipped with communication means 17A (see FIG. 3) which receives image signals indicating photographed images and print orders directly from remote computers through another computer in the same facilities or through the Internet. Namely, the image recording apparatus 1 can function as the so-called network printer apparatus, and it can receive work orders for image signals indicating photographed images and for prints directly from another computer in the same facilities or from the remote computer through the Internet, to conduct image processing on a remote control basis or to form prints. Further, it is also possible to transmit image signals indicating photographed images which have been subjected to the image processing of the invention and accompanying order information to another computer in the same facilities or to a remote computer through the Internet, by using the communication means 17B.

FIG. 3 is a block diagram showing the structure of main portions of image processing section 70. The image processing section 70 will be explained in detail as follows, referring to FIG. 3.

In film scan data processor 71, the image signals inputted from film scanner 9 are subjected to specific proofing operation for film scanner section, negative-positive reversal process for a negative original, removal of dust and scratches, gray balance adjustment (=white balance adjustment), contrast adjustment, removal of granulated noise and sharpness enhancement, and are outputted to image adjustment processor 74. Further, header information and tag information including film sizes, types of negative or positive, information about a principal subject recorded optically or magnetically on a film and information about photographing conditions (for example, contents of described information of APS (Advanced Photo System)) are outputted together to the image adjustment processor 74. Incidentally, in the present specifications, image information includes image signals, header information and tag information together.

Image signals inputted from reflection original input apparatus 10 are subjected to specific proofing operation for the reflection original input apparatus, negative-positive reversal process for a negative original, removal of dust and scratches, gray balance adjustment, contrast adjustment, removal of noise and sharpness enhancement, in reflection original scan data processor 72, and are outputted to image adjustment processor 74 together with tag information.

In image data format decoding processor 73, image signals inputted from image transfer means 30 and communication means 17A are subjected to restoration of compression code and conversion of a method of expression for color signals in case of need, conforming to the data format of the signals, and are converted to the data form suitable for operation in image processor 70, to be sent to the image adjustment processor 74. Further, information about environment light in the course of photographing acquired from header information added to the image signals and from tag information, information about flashlight in the course of photographing, information about zoom magnification in the course of photographing, information about ISO speed, information about a subject distance in the course of photographing and information about white balance adjustment function, are outputted to the image adjustment processor 74 together.

In addition to the foregoing, the structure may also be one wherein information about environment light in the course of photographing inputted from the film scanner 9, reflection original input apparatus 10, image transfer means 30 and communication means 17, information about flashlight in the course of photographing, information about zoom magnification in the course of photographing, information about ISO speed, information about a subject distance in the course of photographing and information about white balance adjustment function, are inputted from operation section 11 to the image adjustment processor 74, in a form to supply and supplement them.

Though the sizes of output images are determined based on the specification inputted from operation section 11, when sizes of output images received from communication means 17A are specified, or when sizes of output images embedded in header information of the image signals acquired by image transfer means 30 and in tag information are specified, image data format decoding processor 73 detects the information and outputs to the image adjustment processor 74, and sizes of output images are determined based on the information stated above.

The image adjustment processor 74 outputs image signals to template processor 79 when template processing is needed, and acquires image signals after template processing. Further, the image adjustment processor 74 conducts image processing for generating an image that gives favorable impression when observed on an output medium, through various methods described later, for image signals obtained from film scanner 9, reflection original input apparatus 10, image transfer section 30, communication means 17A and template processor 79, based on commands from operation section 11 or from control section 7. Then, the image adjustment processor 74 outputs the image-processed image signals to specific processor for CRT 75, specific processors for printer 76 and 77, image data format forming processor 78 and data storage means 81.

Specific processor for CRT 75 conducts processing such as a change of the number of pixels and color matching, in case of need, on image signals acquired from the image adjustment processor 74, and outputs to CRT 8 the signals for display which are composed with information that needs to be displayed such as control information.

Specific processors for printer 76 and 77 conduct processing such as specific proof processing for printer, color matching and a change of the number of pixels, in case of need, on image signals acquired from the image adjustment processor 74, and outputs the image signals to exposure processor 4. When connecting an outer printer such as a larger ink jet printer to image recording apparatus 1 of the present embodiment, a specific processor for printer is provided on each printer to be connected, and appropriate and specific proof processing, color matching and a change of the number of pixels for printer are conducted.

The image data format forming processor 78 conducts conversion to various types of general purpose image format represented by JPEG, TIFF and Exif when occasion demands, for image signals acquired from the image adjustment processor 74, and outputs the image signals to image transport section 31 or to communication means 17B.

Template processor 79 acquires a prescribed template from a plurality of templates stored in template storage means 72 beforehand, through operations of an operator, and composes with the templates for which the image information has been acquired. Further, the template processor 79 composes sample image data selected based on specified sample identifying information D1, D2 and D3 with image data and/or character data based on orders, and forms prints to output them to the image adjustment processor 74. The composition by the template is conducted by a known chromakey method.

Incidentally, the template processing conducted in the template processor 79 makes it possible for a user to order prints after feeling samples in various life sizes, and it can satisfy various demands of users. Further, first sample identifying information D2 that specifies the first sample and data image of the first sample are stored, second sample identifying information D3 that specifies the second sample and data image of the second sample are stored, and sample image data selected based on the first and second sample identifying information D2 and D3 to be specified and image data and/or character data based on the order information are composed, to form prints based on the specified samples. Therefore, it is further possible to compose various types of images and to form prints which meet various demands of users in a wide range.

The aforementioned division including film scan data processor 71, reflection original scan data processor 72, image data format decoding processor 73, the image adjustment processor 74, specific processor for CRT 75, specific processors for printer 76 and 77, image data format forming processor 78, and template processor 79 is division provided for easy understanding of functions of the image processor in the present embodiment, and each of them does not always need to be realized as a device that is physically independent, and the division may also be realized, for example, as one for the types of software processing in a single CPU.

Next, image processing of the invention will be explained.

Incidentally, as an assumption for explanation of operations, a program for realizing each processing described in the following flow chart is stored in ROM of control section 7 in a form of a program code that can be read by a computer, and control section 7 conducts successively operations conforming to the program code. The control section 7 can also conduct successively operations which are specific to the present embodiment, by using programs and data supplied from the outside through a transfer medium.

Incidentally, there is no restriction, in particular, for the method to acquire each information to be used, in the present embodiment, and various methods can be used. For example, it is possible to employ either a structure wherein an operator inputs through operation section 11 or a structure to acquire from additional information (so-called header information and tag information) added to image signals indicating photographed images. With respect to the method to add the additional information, information may be given in the form of an original information format, an independent information file or of a signal. However, it is more preferable to use existing tag information stipulated in various general purpose image format represented by JPEG, TIFF and Exif, or to use an area such as a maker note or a user note which can be used freely. Further, it is also possible to employ the structure wherein each information mentioned above is transferred from a photographing apparatus directly to an image recording apparatus through communication section 17, and when acquiring images recorded on a developed film such as a negative film or a reversal film with a film scanner, it is possible to acquire the image when reading the various types of information recorded optically or magnetically on a film in the course of photographing or before development. A method to acquire various types of information from tag information added to image signals will be explained as follows as an example.

Figure 4:
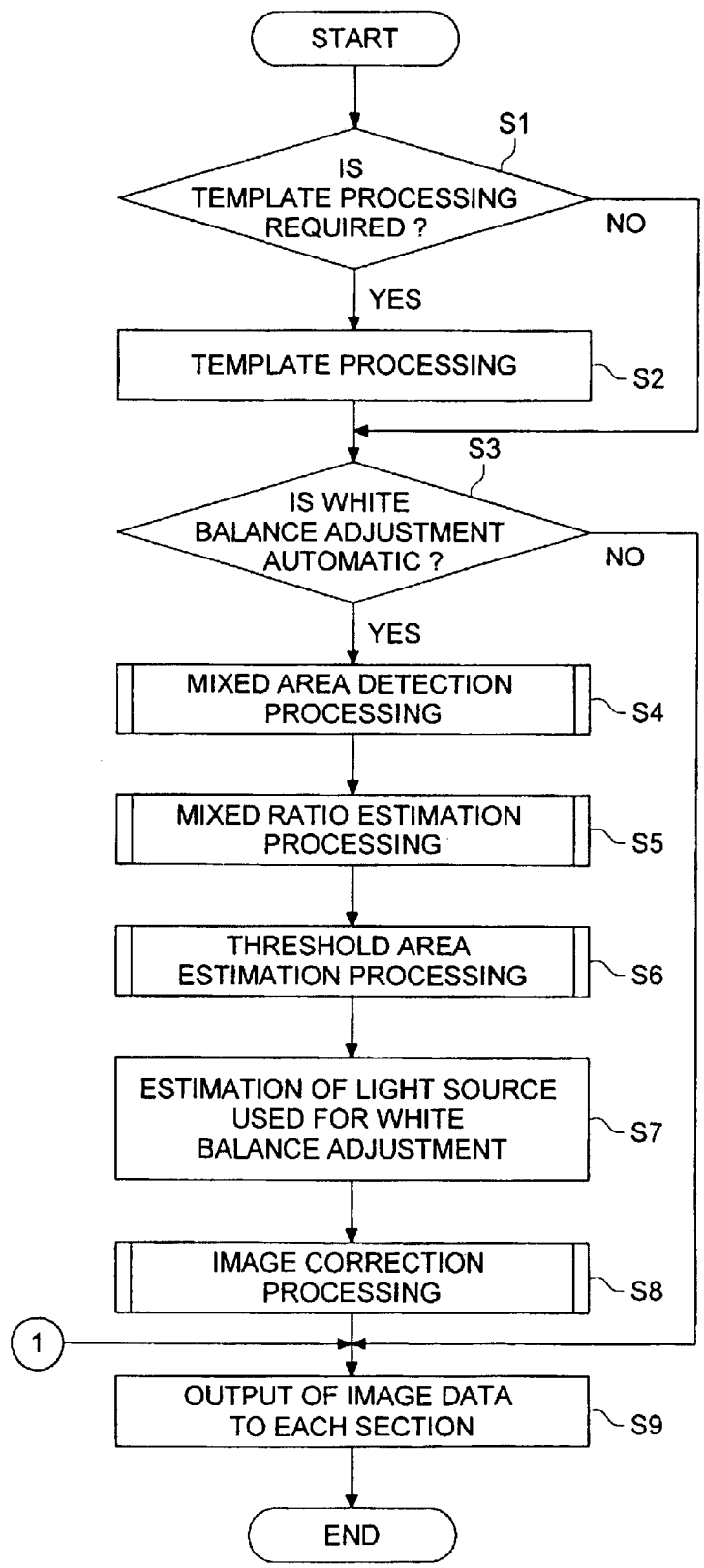
FIG. 4 is a flow chart showing image adjustment processing conducted by control section 7 shown in FIG. 3.

FIG. 4 is a flow chart showing the outline of processing conducted with image adjustment processor 74 by the control of control section 7.

As shown in FIG. 4, the control section 7 judges if instructions for conducting template processing have been inputted (step S1) through operation section 11, when image information is inputted through film scanner 9, reflection original input apparatus 10, image reading section 14 or communication means 17. In this case, when the instructions for conducting template processing have been inputted (step S1; YES), control section 7 outputs image signals to template processor 79 to make it to conduct template processing (step S2). Incidentally, the image signals subjected to template processing are outputted again to the image adjustment processor 74.

On the other hand, when template processing is not conducted (step S1; NO), the control section 7 acquires information about white balance adjustment function of image signals from tag information added to the image signals, and judges if white balance adjustment was conducted automatically in the course of photographing the image signals (step S3).

In this case, the white balance adjustment function is a function which frequently accompany a photographing apparatus such as a digital camera, and it means a function that judges an amount of light in a photographing scene and color information to adjust white balance. The white balance adjustment function is called also as a gray balance adjustment function in a business world where negative images including a negative film scanner are handled, and it is handled to be synonymous also in the invention.

Information about white balance adjustment function includes information showing whether a photographing apparatus has the white balance adjustment function or not, information showing whether the white balance adjustment function worked in the course of photographing or not, information about the state of mode of the white balance adjustment function in the course of photographing (an automatic mode for automatic operation, or, a manual mode wherein a photographer determines manually presence of operations) and contents of information used in determining adjustment conditions of the white balance adjustment function. Incidentally, as an example of the information used in determining adjustment conditions of the white balance adjustment function, there are given contents about types, intensity and characteristics of light which was recognized by the white balance adjustment function as photographing light.

Then, when information showing that white balance adjustment was conducted manually is attached (step S3; NO), this image signal has changed into an image signal in which user's preferences are reflected. Therefore, the control section 7 outputs the image signal to specific processor for CRT 75, specific processors for printer 76 and 77 and image data format forming processor 78 (step S9) without conducting the following processing, and terminates the present image adjustment processing.

On the other hand, when information showing that white balance adjustment was conducted automatically is attached (step S3; YES), the control section 7 conducts a mixed area detection processing that detects an area where environment light and flashlight are mixed (step S4). In this case, the environment light is light whose light source is sunlight, a fluorescent lamp, a glow lamp and tungsten light, while, flashlight is light whose light source is a flash light source.

Figure 5:
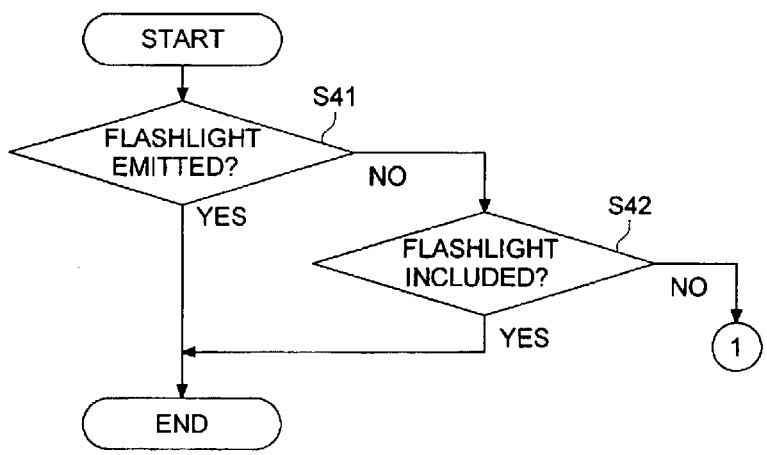
FIG. 5 is a flow chart showing mixed area detection processing conducted by control section 7 shown in FIG. 3.

The mixed area detection processing conducted by the control section 7 will be explained as follows, referring to FIG. 5. As shown in FIG. 5, the control section 7 acquires information about flashlight from tag information attached to image signals, and judges if flashlight was emitted when the image signals were photographed (step S41). When the flashlight is emitted in this case (step S41; YES), mixed ratio estimation processing (see FIG. 6) which will be described later is conducted, because a mixed area where flashlight and environment light are mixed is estimated to be present in the image signals.

Incidentally, information about flashlight includes concretely information showing whether flashlight was emitted or not, detection of reflected flashlight (return information), mode of emission function for flashlight (automatic emitting mode, forced emission mode, forced non-emission mode), presence or absence of a flash function of a photographing apparatus and flashlight emission intensity (for example, energy expressed by a unit of Beam, Candle or Power).

On the other hand, when flashlight is not emitted (step S41; NO), the control section 7 acquires information about environment light from tag information, and judges if flashlight is included (step S42). In this case, even when information about flashlight has a record of no emission of flashlight, flashlight is sometimes emitted, for example, from an outer flash emission device. In this case, it is possible to confirm presence or absence of flashlight from information about environment light, because information showing whether flashlight is included in information about environment light or not is recorded. Incidentally, information about environment light includes information showing concretely a type of a light source (a fluorescent lamp, a tungsten lamp, sunlight (daylight)), a type of a light source accompanying a photographing apparatus (namely, flashlight), the weather (fine weather, cloudy weather, rainy weather, and snowy weather), color temperature and time (morning and evening).

Therefore, when flashlight is judged to be included, based on information about environment light (step S42; YES), a mixed area where flashlight and environment light are mixed is estimated to be present in the image signals, thus, the control section 7 conducts a mixed ratio estimation processing (see FIG. 6). Incidentally, when flashlight is judged not to be included, based on information about environment light (step S42; NO), the flow moves to step S9, because it is estimated that the corresponding photographing was conducted under the photographing light including only environment light, and white balance adjustment functioned in accordance with environment light.

Incidentally, when photographing is carried out in the dark under the emitted flashlight in step S41 of the mixed area detection processing, there is assumed a condition where environment light is hardly included. Therefore, the control section 7 may be in the structure for judging if the photographing is under flashlight only for improving accuracy of image processing, based on information about environment light.

Next, the mixed ratio estimation processing conducted by the control section 7 will be explained, referring to FIG. 6. When conducting the mixed ratio estimation processing, the control section 7 estimates a mixed ratio of flashlight to environment light in an area irradiated by flashlight most intensively.

Figure 6:
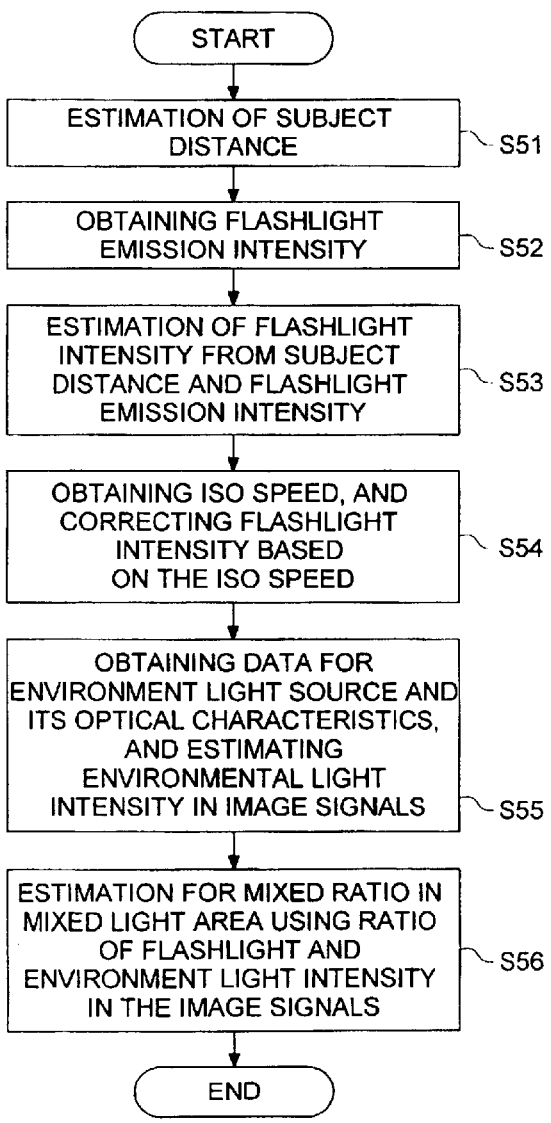
FIG. 6 is a flow chart showing mixed ratio estimation processing conducted by control section 7 shown in FIG. 3.

As shown in FIG. 6, the control section 7 acquires information about subject distance or information about zoom magnification, from tag information, and estimates a subject distance based on the acquired subject distance information or on the zoom magnification (step S51). Since flashlight is emitted toward a principal subject in this case, a distance to the area irradiated by flashlight most intensively approximates to a distance to a principal subject. Accordingly, the distance to the area irradiated by flashlight most intensively is acquired as a subject distance.

Incidentally, information about a subject distance is one indicating a distance from a photographing apparatus to a principal subject, and it may be either an expression such as close view, distant view, and close-up photography, or a practical distance. Information about a zoom magnification means a value of a zoom magnification in the course of photographing, to which, however, the invention is not limited. It may further be one concerning either one of the optical zoom function and the digital zoom function. Optical zooming in this case is a system to change an angle of field by changing a focal length between a film surface or CCD and a lens, while, digital zooming is one of the functions owned by a digital camera, and it is a system to change an angle of field by enlarging an image taken at the central portion of CCD and by conducting interpolation processing.

Incidentally, information about a subject distance and information about a zoom magnification represent one of information to recognize an effective arriving range of flashlight and intensity of flash light applied on a subject, and it especially is information to learn a distance between a flashlight source and a subject accurately, thus, it can be supplemented by other information. For example, it is possible to "estimate information about a zoom magnification" or to supplement "information about a zoom magnification" by using various pieces of information such as "exposure time", "shutter speed", "aperture value", "f-number of a lens", "a focal length of a lens", "35 mm-converted lens focal length" and "photographing scene", individually or in combination.

With respect to information about a zoom magnification, it is possible to collect information concerning a zoom magnification for photographing apparatuses of primary models which are supposed to be used including a photographing apparatus having neither optical zoom lens nor zoom function. It is therefore possible to employ the structure wherein accumulated data are memory-stored in a storage portion (not shown) of image recording apparatus 1 or in a recording medium in advance, then, an apparatus model to be used is recognized in image processing, and thereby, information about a zoom magnification corresponding to the apparatus model is acquired.

Then, the control section 7 acquires emission intensity of flashlight from information about flashlight (step S52). Then, the control section 7 estimates intensity of flashlight in image signals from the acquired subject distance and emission intensity of flashlight (step S53). For the estimation of flashlight intensity wherein a subject distance is used, there is used relationship between a light source and a distance (intensity $\propto 1/(\text{distance})^2$) which is widely known.

Further, the control section 7 acquires information about ISO speed, and corrects intensity of flashlight in image signals (step S54). Namely, a correction coefficient for correcting flashlight is obtained from the ISO speed value, because an effective arriving distance and a range of flashlight varies depending on a difference of ISO speed. To be concrete, LUT (look-up table) corresponding to the correction coefficient is generated, and intensity of flashlight is corrected by the LUT.

Incidentally, ISO speed is a well-known expression that indicates sensitiveness to light and a tolerance. Further, information about ISO speed means, in a digital camera for example, a value conforming to the definition of indication stipulated in ISO 12232 in the digital camera, and it means an ISO speed value printed on a film package, in a silver halide type camera using a film.

In general, a silver halide type camera and a digital camera are accompanied by an automatic light emitting function that expresses electronic flash function and radiates flashlight when an amount of light reflected from a subject is insufficient in photographing, and further, a silver halide type camera and a digital camera are accompanied by an automatic adjusting function that adjusts intensity of flashlight to be radiated, because a deficiency of an amount of light varies depending on ISO speed of a film or of a digital camera. Namely, even in the case where the same subject is photographed under the same environment light, the mixed ratio of flashlight to environment light varies, because an amount of light of flashlight for irradiation varies if ISO speed on the photographing side is different.

Then, the control section 7 acquires a light source type of environment light (for example, sunlight, a fluorescent lamp, a halogen light and tungsten light) from information about environment light, and acquires light characteristics corresponding to the light source type by referring to the table housed beforehand in a storage section of image recording apparatus 1, to estimate intensity of environment light in image signals (step S55). Since the environment light is considered to be applied on the total image evenly in terms of intensity, in this case, the intensity of the environment light can be estimated based on light characteristics for each light source type.

Then, the control section 7 compares intensity of flashlight in image signals with that of the environment light, to estimate a mixed ratio of flashlight to environment light in an area that is irradiated by flashlight most intensively based on the ratio of intensity of each light (step S56), thus, the mixed ratio estimation processing is terminated, and then, threshold area estimation processing (see FIG. 7) which will be described later is conducted.

Incidentally, when tag information does not include information about flashlight or information about environment light, or when information is insufficient, it is possible to estimate intensity of flashlight or of environment light through the following method. In that method, for example, an area of image signals is divided, and hue, chroma and lightness are calculated for each divided area or for each pixel. Then, from data of image signals recorded beforehand in a storage section of image recording apparatus 1, there are extracted divided areas or pixels included in a certain range that is judged to be equivalent to white color under various light sources or under flashlight. Then, the extracted divided area or the extracted pixel is made to be an extracted white area, and information about flashlight or information about environment light is obtained based on hue, chroma and lightness calculated from the image signals, with an average value of hue values of extracted white areas or a central value serving as a standard value.

Or, with respect to information about flashlight, it is possible to measure information about flashlight for primary apparatus models which are presumed to be used. It is therefore possible to employ the structure wherein accumulation data are memory-stored on a storage section of image recording apparatus 1 or on a recording medium in advance, and an apparatus model to be used is recognized in the course of image processing by information of "maker names for an image input apparatus" and "model names for an image input apparatus", and information about flashlight corresponding to the apparatus model is obtained.

Further, it is also possible to obtain information about flashlight and environment light by using various functions such as a quantity of light measuring function accompanying a photographing apparatus such as a camera, or by using a photometry means for the control of automatic exposure, or an imaging element in the case of a digital camera. Or, flashlight and environment light are measured by a spectrophotometer, and information about environment light and flashlight are obtained through the measured values. Incidentally, when using measurement functions accompanying the photographing apparatus or the spectrophotometer, it is also possible to add information about flashlight and environment light to additional information attached to the image signals indicating the photographed images.

Further, when tag information does not include information about a subject distance or information about a zoom magnification, or when information is insufficient, the subject distance may be estimated based on other information.

For example, when the photographing scene is recognized to be a portrait by "information about photographing scene", it is possible to estimate a subject distance, because a principal subject can be assumed to be a face of a person, a size of the person's face in the image is estimated by a means to extract a continuous flesh color area by using a known technology and a size of a face of a general person can be estimated by accumulation of data. When information of reflected flashlight is given, a subject distance can be estimated roughly based on information about presence of reflected light and intensity. When a plurality of the photographing information are given, accuracy of estimation can naturally be enhanced by judgment of combination of the plural information.

Figure 7:
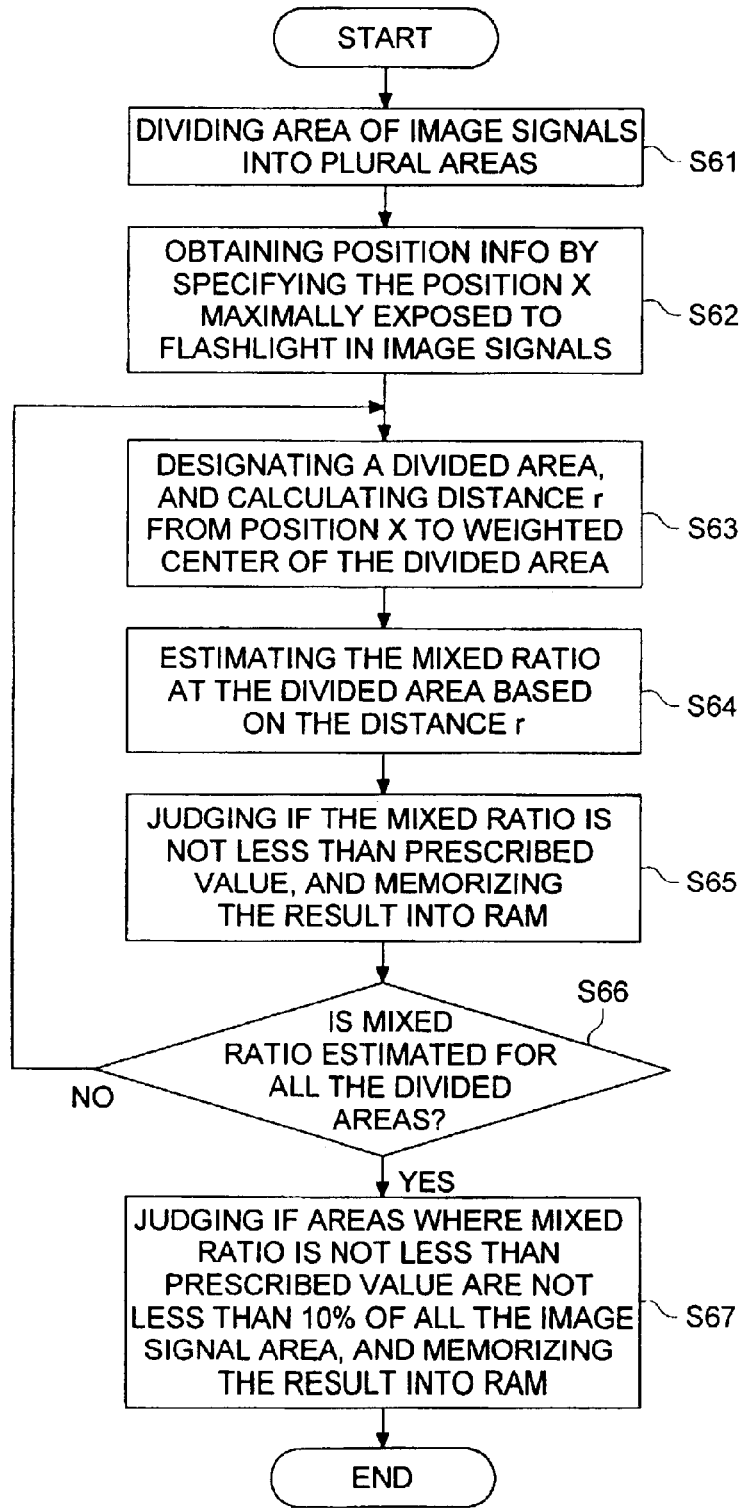
FIG. 7 is a flow chart showing threshold area estimation processing conducted by control section 7 shown in FIG. 3.

Next, threshold area estimation processing conducted by the control section 7 will be explained as follows, referring to FIG. 7. As shown in FIG. 7, the control section 7 divides an image area composed of image signals into plural areas (step S61). Then, the control section 7 specifies position X that is irradiated by flashlight most intensively in the image area, and acquires positional information of the position X (step S62).

After that, the control section 7 acquires one divided area, and calculates distance r from a center of gravity of the acquired area to position X (step S63) to estimate the mixed ratio of flashlight to environment light in the acquired area (step S64). In this case, the total image area is irradiated by environment light almost evenly in terms of intensity, while, intensity of flashlight is gradually attenuated as the position of the flashlight becomes more distant from the area irradiated mostly intensively. Therefore, the mixed ratio in the acquired area is estimated under the assumption that the flashlight is attenuated pursuant to the function of distance r (for example, flashlight decays pursuant to the second power of r).

Thereafter, the control section 7 judges if the estimated mixed ratio is not less than a prescribed value (for example, the mixed ratio of flashlight that is 80% or more is made to be a threshold value), and stores the result of the judgment in RAM provided on the control section 7 (step S65). In addition, the control section 7 judges if the mixed ratio has been estimated for all of the divided areas (step S66), and when not all of the areas are estimated in terms of the mixed ratio (step S66; NO), the flow moves to step S63, and processing steps for steps S63–S65 are repeated.

When all of the areas are estimated in terms of the mixed ratio (step S66; YES), the control section 7 judges if the area where the mixed ratio of flashlight to environment light is not less than a prescribed value is 10% or more of the total image area, and it stores the results of the judgment in RAM (step S68) to terminate the threshold area estimation processing.

After that, the control section 7 moves to image adjustment processing (see FIG. 4), and estimates a type of a light source recognized as a standard for conducting white balance adjustment of image signals, to store the type of the light source in RAM (step S7). As a method to estimate a type of a light source recognized as a standard in conducting white balance in this case, there will be given an example as follows for explanation.

For example, lightness and a hue value of the area (for example, an area that is about 10% of the total image) that surrounds position X acquired in step S62 of the threshold area estimation processing described above, are calculated. Further, an edge area of the image (for example, an upper edge area of the image that is about 10% of the total image) is acquired, and lightness and a hue value of the edge area are calculated. Then, average values of lightness and hue values in the area surrounding position X and the edge area of the image are calculated, and there is acquired a table wherein there are recorded lightness and hue values in the case where a type of each light source housed in a storage section of image recording apparatus 1 is not subjected to white balance adjustment, and the calculated average value is compared with a value corresponding to each type of light source recorded in the table. Due to this, it is possible to estimate the type of the light source based on which the image signals are subjected to white balance adjustment. Namely, it is possible to estimate that the white balance adjustment was conducted based on the type of the light source wherein the calculated average value is the closest to the value of each light source type recorded in the table. Further, mixed presence of plural light sources and further the mixed ratios can be estimated.

Figure 8:
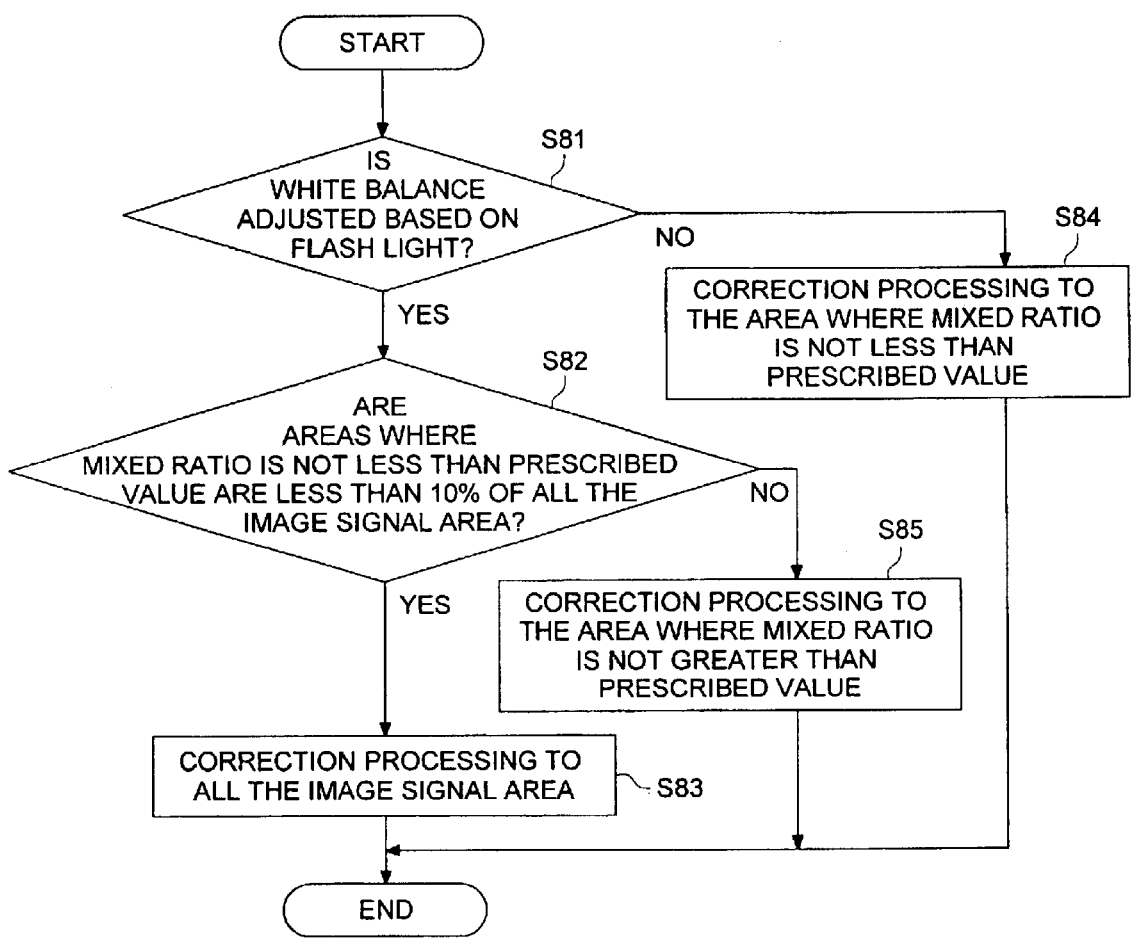
FIG. 8 is a flow chart showing image correction processing conducted by control section 7 shown in FIG. 3.

Then, the control section 7 conducts image correction processing on the area where color balance is lost by white balance adjustment. The image correction processing conducted by the control section 7 will be explained on reference to FIG. 8. As shown in FIG. 8, the control section 7 judges, based on the light source type that is stored in RAM in step S7 of image adjustment processing, if white balance adjustment has been conducted based on information of flashlight (light source type, color temperature and light characteristics) (step S81).

In this case, when the white balance adjustment has not been conducted based on information of flashlight (step S81; NO), namely, when the white balance adjustment has been conducted based on information of environment light, the color balance in the area that is irradiated by flashlight intensively is lost, and therefore, processing for correcting the color balance is conducted on the aforesaid area. In this case, the area that is irradiated by flashlight intensively is an area stored in RAM as one wherein a mixed ratio is a prescribed value or more (for example, flashlight is 80% or more of the total) in threshold area estimation processing (see FIG. 7), then, the mixed ratio of this area is acquired from RAM, and the color balance is corrected, based on the correction conditions in the case of the acquired mixed ratio, and on the correction conditions to cancel the color balance correction in the case where the intensity of environment light for the total image signals is 100% for photographing light.

On the other hand, when the white balance adjustment has been conducted based on information of flashlight (step S81; YES), the control section 7 judges if the area where the mixed ratio is not less than the prescribed value is less than 10% of the area for the total images (step S82). In this case, when the area where the mixed ratio is not less than the prescribed value is less than 10% (step S82; YES), the area where the mixed ratio is a prescribed value or less, namely, the area of 90% or more should originally be subjected to white balance adjustment based on information of environment light, and therefore, color balance in that area is considered to be lose. Accordingly, the control section 7 conducts correction of color balance for the total area of images, based on correction conditions in the case where the intensity of environment light for the total image signals is 100% for photographing light.

Further, when the area where the mixed ratio is not less than the prescribed value is 10% or more (step S82; YES), preferable white balance adjustment is conducted on that area, while, the area where the mixed ratio is not more than the prescribed value should originally be subjected to white balance adjustment based on information of environment light, and that area needs correction of color balance. Accordingly, the control section 7 conducts color balance correction for the area where the mixed ratio is not more than the prescribed value, based on correction conditions in the case where the intensity of environment light for the total image signals is 100% for photographing light, and on the correction conditions to cancel the color balance correction in the case of a presence of a mixed ratio of flashlight to photographing light. Incidentally, the correction conditions stated above represent an example of the correction conditions described in Structures (15), (31) and (47).

Now, a practical method of correction of color balance will be explained as follows, referring to an example. Incidentally, in the definite correction of color balance, image signals are divided into a plurality of areas, and each area is subjected to correction. Further, a table of correction conditions for each light source type used frequently is housed in a storage section of image recording apparatus 1 in advance, and a fine adjustment LUT composed of intensity of each light source type and a fine adjustment coefficient for correction conditions corresponding to the intensity, is further provided.

First, the control section 7 acquires, in a mixed area estimation processing, a type of a light source used in photographing, based on information about acquired flashlight and information about environment light, and acquires correction conditions corresponding to the aforesaid type of a light source from the table of correction conditions. Then, the control section 7 acquires from the fine adjustment LUT a fine adjustment coefficient corresponding to the intensity of each light source type acquired in threshold area estimation processing, and obtains correction values in the case of 100% irradiation of each light source type by multiplying the correction conditions by the fine adjustment coefficient. Then, the control section 7 determines a correction value for correcting tint of mixed light, based on a mixed ratio in each divided area.

For example, in a divided area, when mixed ratio of flashlight is 70% and mixed ratio of environment light is 30%, the sum of a value obtained by multiplying the correction value in the case of 100% irradiation of flashlight by 0.7 and of a value obtained by multiplying the correction value in the case of 100% irradiation of environment light by 0.3 may be made to be a correction value for that area.

Correction processing conducted by the correction value determined in the above way will be explained qualitatively.

It is possible to correct color balance so that tint of light wherein flashlight and environment light are mixed in the estimated mixed ratio may be changed to tint that is obtained by photographing under daylight, and when environment light is a fluorescent lamp, for example, the correction condition is determined so that a greenish tint may be controlled, while when environment light is tungsten light, attention is paid to leave a yellowish tint, without matching to a tint of daylight, because an atmosphere and a memory color of a photographing place are prized. Or, with respect to flashlight, its tint is enhanced because it easily turns white.

When a person is detected (not shown) as the subject in particular, in the area representing the subject of correction processing, a continuous flesh color area is extracted, and conditions to correct the flesh color to the prescribed flesh color prepared in advance are added. Further, for the purpose of smoothing skin texture and of giving soft impression, frequency division processing is conducted, then, noise removal processing for controlling intensity of medium frequency component is conducted, and processing conditions to control contrast are added. Since high frequency component obtained through the frequency division processing is estimated to be for eyes and hair among high density regions surrounded by flesh color areas or surrounding a flesh color area, there are added sharpness enhancement conditions. Namely, in the present embodiment, image processing such as contrast correction processing, hue correction processing, chroma correction processing, lightness correction processing and sharpness enhancement processing are conducted, in addition to color balance correction processing.

Further, when information about user's preference tendency has been acquired, or when information usable for estimating user's preference tendency has been acquired, contents of image processing in the invention are corrected based on acquired or estimated user's preference tendency.

Image signals corrected in terms of color balance as in the foregoing are outputted to specific processor for CRT 75, specific processors for printer 76 and 77 and image data format forming processor 78 by the instruction of the control section 7 (step S9), and the present image adjustment processing is terminated.

Therefore, the image recording apparatus 1 in the present embodiment makes it possible to give an image which an observer feels to be ideal for both a face (skin color and texture, in particular) of a person and a background, even when white balance adjustment is conducted automatically on the image obtained through flash photographing under the condition wherein environment light and flashlight are different each other in terms of a tint. Further, the control section 7 of the image recording apparatus 1 can provide an image that gives preferable impressions in a simple and general purpose method, without conducting highly loaded calculation, just by acquiring or estimating various simple and plain information. Since it is further possible to conduct the aforesaid image processing by acquiring necessary information from header information and tag information attached to image signals, or by estimating necessary information from the header information and tag information, the invention may be applied to the complicated environment wherein image signals generated by various types of photographing apparatuses are mixed to be received through media and communication means.

Incidentally, there is a possibility that there are mixed image signals which have already been subjected to image processing based on consideration to offer an image that gives a pleasant impression when the image is observed on an output medium, and image signals which need prohibition of image processing in outputting based on specific intentions, in image signals indicating photographed images. With respect to the image signals of this kind, it is preferable that information to the effect of prohibition of image processing in outputting is described beforehand on header information in various types of general purpose image formats represented by JPEG, TIFF and Exif or on tag information, or an operator instructs prohibition of image processing through operation section 11. In the present embodiment, therefore, the header information, tag information and instructions from operation section 11 are checked, and when image processing is prohibited, contents of image processing are determined to be "without image processing".

Further, with respect to information which is acquired, judged or estimated in the process up to this moment and determined contents of processing, they may be added to additional information (so-called tag information or the like) attached to image signals indicating photographed images, or they may be modified. Additional information of this kind is attached as an original information format, an independent information file or of a signal. However, it is more preferable to use existing tag information stipulated in various general purpose image format represented by JPEG, TIFF and Exif, or to use an area usable freely such as a maker note or a user note. Further, an operator may input in image recording apparatus 1, or images recorded on a developed film such as a negative film or a reversal film are read by a film scanner for image recording, and when image processing of the invention is conducted, it is possible to recorded optically or magnetically on a film.

Since an image generated through flash photographing is photographed under circumstances wherein environment light and flashlight are mixed, as stated above, characteristics of controlled light vary depending on an area of the image. For example, a subject positioned to be closer to a flashlight source is irradiated by light having characteristics of flashlight densely, while, a subject positioned to be farther from a flashlight source and a background are irradiated by a fluorescent lamp, tungsten light or light having characteristics of sunlight densely in backlight photographing, on the contrary.

Therefore, in the invention, when determining contents of image processing, it is preferable to determine based on the aforesaid "information about environment light in the course of photographing", "information about flashlight in the course of photographing", "information about a zoom magnification" and "information about ISO speed", and it is further preferable to determine based on "information about a subject distance in the course of photographing", and it is more preferable to determine by using a means to "estimate if the area irradiated by both environment light and flashlight is present in images".

Further, it is more preferable to determine by using a means to "estimate the mixed ratio of flashlight to environment light in the course of photographing" and it further is more preferable to determine by using a means to "detect an area where the mixed ratio of flashlight to environment light in the course of photographing is not less than the prescribed value". Or, it is preferable to determine by using the combination of the aforesaid means, and it is more preferable to determine contents of image processing in accordance with hue information of the detected "area having the mixed ratio of flashlight to environment light that is not less than the prescribed value". It is more preferable to determine contents of image processing by "judging if a flesh color is included" in the aforesaid detected "area where a value of the mixed ratio of flashlight to environment light is not less than the prescribed value".

Further, when "estimating if an area irradiated by both of environment light and flashlight is present in images", it is preferable to use information concerning "information about environment light in the course of photographing" and "information about flashlight in the course of photographing", and it is preferable to use information concerning "information about environment light in the course of photographing", "information about flashlight in the course of photographing" and "information about a subject distance in the course of photographing".

For example, since at least a single light is needed for photographing, it is recognized that flashlight is emitted, from "information about flashlight in the course of photographing", and further, it is possible to estimate that "an area irradiated by both of environment light and flashlight is present" in images, if a light source of environment light is other than flashlight from "information about environment light in the course of photographing". Furthermore, by using "information about flashlight in the course of photographing" and "information about a subject distance in the course of photographing" in combination, a photographing scene under a fluorescent lamp in a room can be estimated, and "presence of an area irradiated by both of environment light and flashlight in images" can be estimated, if environment light that clearly requires flash emission, such as, for example, a fluorescent lamp is recognized and a subject distance is short. The method of the estimation is not limited to the foregoing, and other useful pieces of information such as information about photographing scene (for example, portrait) may also be used.

When "estimating the mixed ratio of flashlight to environment light in the course of photographing", it is preferable to use at least one of "information about flashlight in the course of photographing", "information about a subject distance in the course of photographing" and "information about ISO speed", and it is more preferable to use a plurality of the aforesaid information in combination.

For example, problems which are caused when a subject is irradiated by light wherein environment light and flashlight in the course of photographing are mixed, include a problem that a tint is different from a preference of an observer. In addition, existing photographing apparatuses such as a lens-fitted film unit, a compact camera and SLR camera, in the case of a silver halide type camera, for example, are various in terms of their grades and their functions, and they differ each other greatly in terms of capability. In the case of a silver halide type camera, ISO speeds for films to be used therein are diversified, and estimation of intensity of flashlight is important for determining contents of image processing with a high precision. By using the information mentioned above, it is possible to conduct highly accurate simulation for spectral characteristics which have an influence on characteristics and tint of light wherein environment light and flashlight are mixed with various mixture ratios.

For example, by recording spectral characteristics of various types of light sources including flashlight on a memory of an image recording apparatus, it is possible to select and estimate spectral characteristics of environment light and spectral characteristics of flashlight from the types of light sources recognized by information about environment light, and further, intensity of flashlight applied on a subject can be estimated from a distance between a flashlight source and a subject estimated from "information about a zoom magnification" and from "information about a subject distance" and from "information about ISO speed", and thus, spectral characteristics of light wherein environment light and flashlight are mixed in various mixture ratios can be calculated. By utilizing the result of this calculation, "mixed ratio of flashlight to environment light in the course of photographing" of a prescribed area may be estimated. It is also possible to estimate a mixed ratio of flashlight to environment light in the course of photographing for each microscopic area generated by dividing images, and thereby to correct a tint individually. The mixed ratio of flashlight to environment light described in this case is defined, for example, to be a ratio of flashlight intensity to sum of flashlight intensity and environment light intensity, but is not restricted to this definition.

Further, it was impossible for the prior art to have sufficient effect of correcting a tint properly. In particular, when color correction is carried out, placing emphasis on environment light by which the background is irradiated, a subject (a person, in particular) irradiated by light wherein environment light and flashlight are mixed, or irradiated more intensively by flashlight than by environment, has been corrected to an uncomfortable tint. To solve this problem, therefore, detection of "an area wherein the mixed ratio of flashlight to environment light in the course of photographing has a value that is not less than a prescribed value", namely, "an area irradiated by flashlight more intensively" is one of important process for working of the present invention.

An area where a value of the mixed ratio of flashlight to environment light obtained from the method to "estimate the mixed ratio of flashlight to environment light in the course of photographing" is not less than a prescribed value may be detected. In that case, it is also preferable to use "information about a subject area" and "information about a subject position". In general, flashlight is emitted toward a subject in many cases, information about a position or an area where the mixed ratio of flashlight is high in the image is effective, for conducting processing of detection simply and on a low-load basis.

Further, a method of setting white balance adjustment conditions varies greatly, depending on photographing apparatuses, and appropriate conditions are not always established. For example, in the scene where environment light and flashlight are mixed such as one in the occasion of flash photographing, characteristics of photographing light vary greatly, depending on an image area, thus, it is difficult to set white balance adjustment conditions so that preferable output images may be obtained. For example, if conditions are set, referring to information about average tint of images, both a subject (person) irradiated by flashlight intensively and a background irradiated intensively by environment light are finished inappropriately. If conditions are set with reference to information about a tint on a focused area only, for placing emphasis on a finish of a primary subject, the background is finished improperly. For obtaining an ideal output image, therefore, it is important to recognize the conditions for white balance adjustment function provided on a photographing apparatus.

In the invention, it is preferable to determine contents of image processing in accordance with information about white balance adjustment function. Namely, it is more preferable to determine contents of image processing in accordance with whether the white balance adjustment function operates or not in the course of photographing, in information about the white balance adjustment function, and it is more preferable to determine contents of image processing in accordance with contents of information used in the case of determining adjustment conditions of the operating white balance adjustment function.

The information about white balance adjustment function means whether the photographing apparatus has the white balance adjustment function or not, whether the white balance adjustment function operated or not in the course of photographing, the state of mode of the white balance adjustment function in the course of photographing (an automatic operation mode or a mode wherein a photographer determines presence or absence of operations), and contents of information used in the case of determining adjustment conditions for white balance adjustment function. As an example of information used in the case of determining adjustment conditions for white balance adjustment function, there are given contents about types, intensity and characteristics of light which was recognized by the white balance adjustment function to be photographing light.

(Effect of the Invention)

The technology of the invention makes it possible to realize an image processing method, an image processing apparatus and an image recording apparatus, which give an image that is felt by an observer to be ideal for both of a face of a person (a skin color and texture, in particular) and a background, even in the case of an image obtained by flash photographing under the condition that environment light and flashlight are different each other in terms of a tint. Further, the invention provides an image processing method that gives an image which makes pleasant impression in a simple and general purpose method without highly loaded calculation, only by acquiring or estimating various and simple information. Further, by acquiring information needed by the invention or by estimating information needed by the invention from the tag information, it is possible to realize an image processing method, an image processing apparatus and an image recording apparatus which can adjust themselves to the complicated surroundings wherein image signals indicating photographed images generated by a variety of photographing apparatuses are mixed and are received through media and communication means.

What is claimed is:

1. An image processing method to conduct an image processing on image signals indicating a photographed image for generating image signals for output, comprising:
    detecting an area in the photographed image where the mixed ratio of flashlight to environment light in the course of photographing is greater than a prescribed value, based on respective information including information about environment light in the course of photographing, information about flashlight in the course of photographing, and at least one of information about zoom magnification in the course of photographing, information about ISO speed and information about a subject distance in the course of photographing; and
    determining a content of image processing in accordance with a ratio of the area detected to the total area of the photographed image.

2. The image processing method claim 1, wherein the respective information further includes information about a subject distance in the course of photographing.

3. The image processing method of claim 1, further comprising:
    obtaining information about a white balance adjustment function of a photographing apparatus used to get the photographed images; and
    determining a content of image processing based on the obtained information about a white balance adjustment function.

4. The image processing method of claim 1, wherein information about the flashlight includes information of return of the flashlight.

5. The image processing method claim 1, wherein when detecting an area where the mixed ratio of flashlight to environment light both in the course of photographing is greater than a prescribed value, the detecting is conducted based on at least one of information about a subject area and information about a subject position.

6. The image processing method of claim 1, wherein the content of image processing includes at least one of contrast correction processing, color balance correction processing, hue correction processing, chroma correction processing, lightness correction processing, and sharpness enhancement processing.

7. The image processing method of claim 6, wherein the content of image processing includes color balance correction processing, whose correction condition being determined based on at least one of information about environment light in the course of photographing and information about flashlight in the course of photographing.

8. The image processing method according to claim 7, wherein information about the environment light and information about the flashlight include information about light characteristics.

9. An image processing method to conduct an image processing on image signals indicating a photographed image for generating image signals for output, comprising:
    estimating whether or not an area irradiated by both of environment light and flashlight is present in the photographed image, based on information about environment light in the course of photographing and information about flashlight in the course of photographing;
    detecting an area in the photographed image where the mixed ratio of flashlight to environment light in the course of photographing is greater than a prescribed value, based on information about environment light in the course of photographing, information about flashlight in the course of photographing, and on at least one of information about zoom magnification in the course of photographing, information about ISO speed and information about a subject distance in the course of photographing; and
    determining a content of the image processing in accordance with a ratio of the area detected to the total area of the photographed image.

10. The image processing method of claim 9, wherein estimating whether or not an area irradiated by both of environment light and flashlight is present in the photographed image is conducted, based on information about environment light in the course of photographing, information about flashlight in the course of photographing and information about a subject distance in the course of photographing.

11. An image processing method to conduct an image processing on image signals indicating a photographed image for generating image signals for output, comprising:
    estimating whether or not an area irradiated by both of environment light and flashlight is present in the photographed image, based on information about environment light in the course of photographing and information about flashlight in the course of photographing;
    estimating a mixed ratio of flashlight to environment light both in the course of photographing based on information about environment light in the course of photographing, information about flashlight in the course of photographing and, at least one of information about zoom magnification in the course of photographing, information about ISO speed and information about a subject distance in the course of photographing;
    detecting an area where the mixed ratio of flashlight to environment light in the course of photographing is greater than a prescribed value; and
    determining a content of the image processing in accordance with a ratio of the area detected to the total area of photographed images.

12. The image processing method of claim 11, wherein estimating whether or not an area irradiated by both of environment light and flashlight is present in the photographed images is conducted, based on information about environment light in the course of photographing, information about flashlight in the course of photographing and information about subject distance in the course of photographing.

13. An image processing method to conduct an image processing on image signals indicating a photographed image for generating image signals for output, comprising:
   obtaining information about a white balance adjustment function of a photographing apparatus used to get the photographed images; and
   determining a content of image processing based on the obtained information about a white balance adjustment function.

14. The image processing method according to claim 13, further comprising:
   estimating whether or not the white balance adjustment function operated automatically in the course of photographing; and
   determining the content of image processing based on the results of the estimating.

15. The image processing method of claim 14, wherein when the white balance adjustment function is estimated to have operated automatically in the course of photographing, the content of the image processing is determined based on information used in determining an adjustment condition for the white balance adjustment function.

16. The image processing method of claim 15, wherein the information used in determining the adjustment condition for the white balance adjustment function comprises information about light for photographing.

17. An image processing apparatus to conduct an image processing on image signals indicating a photographed image for generating image signals for output, comprising:
   a detecting section for detecting an area in the photographed image where the mixed ratio of flashlight to environment light in the course of photographing is greater than a prescribed value, based on respective information including information about environment light in the course of photographing, information about flashlight in the course of photographing, and at least one of information including information about zoom magnification in the course of photographing, information about ISO speed and information about a subject distance in the course of photographing; and
   an image processing section for determining a content of image processing in accordance with a ratio of the area detected to the total area of the photographed image to conduct an image processing on the image signals indicating a photographed image.

18. The image processing apparatus of claim 17, wherein the respective information further includes information about a subject distance in the course of photographing.

19. The image processing apparatus of claim 17, further comprising:
   an information obtaining section for obtaining information about a white balance adjustment function of a photographing apparatus used to get the photographed images, wherein the image processing section determines the content of image processing further based on the obtained information about a white balance adjustment function.

20. The image processing apparatus of claim 17, wherein information about the flashlight includes information of return of the flashlight.

21. The image processing apparatus of claim 17, wherein the area detecting section detects an area where the mixed ratio of flashlight to environment light both in the course of photographing is greater than a prescribed value, based on at least one of information about a subject area and information about a subject position.

22. The image processing apparatus of claim 17, wherein the content of image processing includes at least one of contrast correction processing, color balance correction processing, hue correction processing, chroma correction processing, lightness correction processing, and sharpness enhancement processing.

23. The image processing apparatus of claim 22, wherein the content of image processing includes color balance correction processing, whose correction condition being determined based on at least one of information about environment light in the course of photographing and information about flashlight in the course of photographing.

24. The image processing apparatus of claim 23, wherein information about the environment light and information about the flashlight include information about light characteristics.

25. An image processing apparatus to conduct an image processing on image signals indicating a photographed image for generating image signals for output, comprising:
   a mixed area estimating section for estimating whether or not an area irradiated by both of environment light and flashlight is present in the photographed image, based on information about environment light in the course of photographing and information about flashlight in the course of photographing;
   an area detecting section for detecting an area in the photographed image where the mixed ratio of flashlight to environment light in the course of photographing is greater than a prescribed value, based on information about environment light in the course of photographing, information about flashlight in the course of photographing, and on at least one of information about zoom magnification in the course of photographing, information about ISO speed and information about a subject distance in the coursed of photographing; and
   an image processing section for determining a content of image processing in accordance with a ratio of the area detected to the total area of the photographed image to conduct an image processing on the image signals indicating a photographed image.

26. The image processing apparatus of claim 25, wherein the mixed area estimating section estimates whether or not an area irradiated by both of environment light and flashlight is present in the photographed image, based on information about environment light in the course of photographing, information about flashlight in the course of photographing and information about a subject distance in the course of photographing.

27. An image processing apparatus to conduct an image processing on image signals indicating a photographed image for generating image signals for output, comprising:
   an mixed area estimating section for estimating whether or not an area irradiated by both of environment light and flashlight is present in the photographed image, based on information about environment light in the course of photographing and information about flashlight in the course of photographing;
   a mixed ratio estimating section for estimating a mixed ratio of flashlight to environment light both in the course of photographing based on information about environment light in the course of photographing, information about flashlight in the course of photographing and, at least one of information about zoom magnification in the course of photographing, information about ISO speed and information about a subject distance in the course of photographing an area detecting section for detecting an area where the mixed ratio of flashlight to environment light in the course of photographing is greater than a prescribed value; and an image processing section for determining a content of image processing in accordance with a ratio of the area detected to the total area of the photographed image to conduct an image processing on the image signals indicating a photographed image.

28. The image processing apparatus of claim 27, wherein the mixed area estimating section estimates whether or not an area irradiated by both of environment light and flashlight is present in the photographed image, based on information about environment light in the course of photographing, information about flashlight in the course of photographing and information about a subject distance in the course of photographing.

29. An image processing apparatus to conduct an image processing on image signals indicating a photographed image for generating image signals for output, comprising:

an information obtaining section for obtaining information about a white balance adjustment function of a photographing apparatus used to get the photographed images; and an image processing section for determining a content of image processing based on the obtained information about a white balance adjustment function to conduct an image processing on the image signals indicating a photographed image.

30. The image processing apparatus of claim 29, wherein the image processing section makes an estimation whether or not the white balance adjustment function operated automatically in the course of photographing, and determines the content of image processing based on the results of the estimation.

31. The image processing apparatus of claim 30, wherein when the white balance adjustment function is estimated to have operated automatically in the course of photographing, the content of the image processing is determined based on information used in determining an adjustment condition for the white balance adjustment function.

32. The image processing apparatus of claim 31, wherein the information used in determining the adjustment condition for the white balance adjustment function comprises information about light for photographing.

33. An image recording apparatus to conduct an image processing on image signals indicating a photographed image inputted by an image inputting means for generating image signals for output, and to record the image signals for output, comprising:

a detecting section for detecting an area in the photographed image where the mixed ratio of flashlight to environment light in the course of photographing is greater than a prescribed value, based on respective information including information about environment light in the course of photographing, information about flashlight in the course of photographing, and at least one of information including information about zoom magnification in the course of photographing, information about ISO speed and information about a subject distance in the course of photographing;

an image processing section for determining a content of image processing in accordance with a ratio of the area detected to the total area of the photographed image to conduct an image processing on the image signals indicating a photographed image, and for generating image signals for output; and a recording section for recording the image signals for output onto a recording medium.

34. The image recording apparatus of claim 33, wherein the respective information further includes information about a subject distance in the course of photographing.

35. The image recording apparatus of claim 33, further comprising:

an information obtaining section for obtaining information about a white balance adjustment function of a photographing apparatus used to get the photographed images, wherein the image processing section determines the content of image processing further based on the obtained information about a white balance adjustment function.

36. The image recording apparatus of claim 33, wherein information about the flashlight includes information of return of the flashlight.

37. The image recording apparatus of claim 33, wherein the area detecting section detects an area where the mixed ratio of flashlight to environment light both in the course of photographing is greater than a prescribed value, based on at least one of information about a subject area and information about a subject position.

38. The image recording apparatus of claim 33, wherein the content of image processing includes at least one of contrast correction processing, color balance correction processing, hue correction processing, chroma correction processing, lightness correction processing, and sharpness enhancement processing.

39. The image recording apparatus of claim 38, wherein the content of image processing includes color balance correction processing, whose correction condition being determined based on at least one of information about environment light in the course of photographing and information about flashlight in the course of photographing.

40. The image recording apparatus of claim 39, wherein information about the environment light and information about the flashlight include information about light characteristics.

41. The image recording apparatus of claim 33, wherein the recording section prints the image signals for output on a print medium to output.

42. The image recording apparatus of claim 33, wherein the recording section prints the image signals for output on a silver halide type photographic paper to output.

43. The image recording apparatus of claim 33, wherein the recording section prints the image signals for output on a print medium through an ink-jet method to output.

44. The image recording apparatus of claim 33, wherein the recording section prints the image signals for output on a print medium through an electrophotographic method to output.

45. The image recording apparatus of claim 33, wherein the recording section prints the image signals for output on a print medium through a sublimation method.

46. The image recording apparatus of claim 33, wherein the recording section prints the image signals for output on a print medium through a thermal recording method.

47. The image recording apparatus of claim 33, wherein the recording section records the image signals on a recording medium as digital data.

48. The image recording apparatus of claim 47, wherein the recording medium is at least one of CD-R, CD-RW, MD, memory card, IC card, flexible disk and magneto-optical disk.

49. An image recording apparatus to conduct an image processing on image signals indicating a photographed image inputted by an image inputting means for generating image signals for output, and to record the image signals for output, comprising:

a mixed area estimating section for estimating whether or not an area irradiated by both of environment light and flashlight is present in the photographed image, based on information about environment light in the course of photographing and information about flashlight in the course of photographing;

an area detecting section for detecting an area in the photographed image where the mixed ratio of flashlight to environment light in the course of photographing is greater than a prescribed value, based on information about environment light in the course of photographing, information about flashlight in the course of photographing, and on at least one of information about zoom magnification in the course of photographing, information about ISO speed and information about a subject distance in the coursed of photographing;

an image processing section for determining a content of image processing in accordance with a ratio of the area detected to the total area of the photographed image to conduct an image processing on the image signals indicating a photographed image, and for generating image signals for output; and a recording section for recording the image signals for output onto a recording medium.

50. The image recording apparatus of claim 49, wherein the mixed area estimating section estimates whether or not an area irradiated by both of environment light and flashlight is present in the photographed image, based on information about environment light in the course of photographing, information about flashlight in the course of photographing and information about a subject distance in the course of photographing.

51. An image recording apparatus to conduct an image processing on image signals indicating a photographed image inputted by an image inputting means for generating image signals for output, and to record the image signals for output, comprising:

an mixed area estimating section for estimating whether or not an area irradiated by both of environment light and flashlight is present in the photographed image, based on information about environment light in the course of photographing and information about flashlight in the course of photographing;

a mixed ratio estimating section for estimating a mixed ratio of flashlight to environment light both in the course of photographing based on information about environment light in the course of photographing, information about flashlight in the course of photographing and, at least one of information about zoom magnification in the course of photographing, information about ISO speed and information about a subject distance in the course of photographing an area detecting section for detecting an area where the mixed ratio of flashlight to environment light in the course of photographing is greater than a prescribed value;

an image processing section for determining a content of image processing in accordance with a ratio of the area detected to the total area of the photographed image to conduct an image processing on the image signals indicating a photographed image, and for generating image signals for output; and a recording section for recording the image signals for output onto a recording medium.

52. The image recording apparatus of claim 51, wherein the mixed area estimating section estimates whether or not an area irradiated by both of environment light and flashlight is present in the photographed image, based on information about environment light in the course of photographing, information about flashlight in the course of photographing and information about a subject distance in the course of photographing.

53. An image recording apparatus to conduct an image processing on image signals indicating a photographed image inputted by an image inputting means for generating image signals for output, and to record the image signals for output, comprising:

an information obtaining section for obtaining information about a white balance adjustment function of a photographing apparatus used to get the photographed images;

an image processing section for determining a content of image processing based on the obtained information about a white balance adjustment function to conduct an image processing on the image signals indicating a photographed image, and for generating image signals for output; and a recording section for recording the image signals for output onto a recording medium.

54. The image recording apparatus of claim 53, wherein the image processing section makes an estimation whether or not the white balance adjustment function operated automatically in the course of photographing, and determines the content of image processing based on the results of the estimation.

55. The image recording apparatus of claim 54, wherein when the white balance adjustment function is estimated to have operated automatically in the course of photographing, the content of the image processing is determined based on information used in determining an adjustment condition for the white balance adjustment function.

56. The image recording apparatus of claim 55, wherein the information used in determining the adjustment condition for the white balance adjustment function comprises information about light for photographing.

\* \* \* \* \*